(12) United States Patent
Ushirosako et al.

(10) Patent No.: US 9,869,485 B2
(45) Date of Patent: Jan. 16, 2018

(54) SYSTEM AND METHOD FOR CONTROLLING AN HVAC UNIT BASED ON THERMOSTAT SIGNALS

(71) Applicant: Mitsubishi Electric Corporation, Tokyo (JP)

(72) Inventors: Hiroaki Ushirosako, Suwanee, GA (US); Matthew Wesley Smithson, Suwanee, GA (US); Masato Tanigawa, Suwanee, GA (US)

(73) Assignee: Mitsubishi Electric Corporation, Tokyo (JP)

( * ) Notice: Subject to any disclaimer, the term of this patent is extended or adjusted under 35 U.S.C. 154(b) by 426 days.

(21) Appl. No.: 14/633,629

(22) Filed: Feb. 27, 2015

(65) Prior Publication Data
US 2016/0252266 A1    Sep. 1, 2016

(51) Int. Cl.
*G05B 13/00*    (2006.01)
*G05B 15/00*    (2006.01)
(Continued)

(52) U.S. Cl.
CPC ........ *F24F 11/006* (2013.01); *F24D 19/1084* (2013.01); *F24F 3/00* (2013.01); *F24F 11/0012* (2013.01); *F24F 11/0076* (2013.01); *F24F 11/0086* (2013.01); *G05B 15/02* (2013.01); *G05D 23/1902* (2013.01); *G05D 23/1917* (2013.01); *F24F 2011/0046* (2013.01); *F24F 2011/0047* (2013.01); *F24F 2011/0057* (2013.01); *F24F 2011/0063* (2013.01); *F24F 2011/0064* (2013.01);
(Continued)

(58) Field of Classification Search
CPC .......... G05D 23/1904; G05D 23/1917; G05D 23/1902; G05B 2219/2614; G05B 15/02

USPC ........................................ 700/276, 277, 278
See application file for complete search history.

(56) References Cited

U.S. PATENT DOCUMENTS

2005/0257538 A1    11/2005  Hwang et al.
2008/0314998 A1*   12/2008  Herzon ................ F24F 11/0012
                                              236/1 C
(Continued)

FOREIGN PATENT DOCUMENTS

KR    2012-0017840 A    2/2012

OTHER PUBLICATIONS

International Search Report dated Jun. 27, 2016 in the corresponding PCT application No. PCT/JP2016/000160.

*Primary Examiner* — Michael J Brown
(74) *Attorney, Agent, or Firm* — Posz Law Group, PLC

(57) ABSTRACT

A method is provided for controlling an HVAC unit, including: receiving input signals from a thermostat; setting a mode of the HVAC unit to a heating mode when a heating signal is enabled, or to a cooling mode when a cooling signal is enabled; setting a capacity of the HVAC unit to a set capacity based on the input signals; calculating a heating/cooling change rate based on temperature data received from the HVAC unit; comparing the heating/cooling change rate with a threshold; maintaining the HVAC unit at the set capacity percentage if the heating/cooling change rate is equal to the threshold; lowering the current capacity by a first cooling increment, to a minimum of 0%, if the heating/cooling change rate is above the threshold; and raising the current capacity by a second cooling increment, to a maximum of 100%, if the heating/cooling change rate is below the threshold.

26 Claims, 13 Drawing Sheets

(51) Int. Cl.
*F24F 11/00* (2006.01)
*F24D 19/10* (2006.01)
*F24F 3/00* (2006.01)
*G05B 15/02* (2006.01)
*G05D 23/19* (2006.01)

(52) U.S. Cl.
CPC ............ *F24F 2011/0068* (2013.01); *F24F 2011/0075* (2013.01); *G05B 2219/2614* (2013.01)

(56) References Cited

U.S. PATENT DOCUMENTS

| | | |
|---|---|---|
| 2010/0023168 A1 | 1/2010 | Kai et al. |
| 2010/0218527 A1 | 9/2010 | Kitagishi et al. |
| 2013/0261809 A1 | 10/2013 | Morrow et al. |

* cited by examiner

SYSTEM AND METHOD FOR CONTROLLING AN HVAC UNIT BASED ON THERMOSTAT SIGNALS

FIELD OF THE INVENTION

The present invention relates generally to heating, ventilation, and air conditioning (HVAC) systems that are controlled by an external thermostat. More particularly, the present invention relates to a system and method for controlling the operation of an HVAC system connected to a single or multiple-stage thermostat.

BACKGROUND OF THE INVENTION

A thermostat is a temperature-sensitive switch, or collection of switches, that provide signals to control heating, ventilating, and air conditioning (HVAC) systems based on parameters measured by the thermostat. American thermostats typically provide a simple ON/OFF signal to indicate when cooling or heating is required. For example, a cooling signal will be ON and a heating signal will be OFF when the parameters at the thermostat indicate that the HVAC system should be cooling an area. Likewise, a heating signal will be ON and a cooling signal will be OFF when the parameters at the thermostat indicate that the HVAC system should be heating the area.

In an effort to boost efficiency and gain a competitive advantage, however, many HVAC manufacturers have created HVAC systems that allow for multiple operation stages. These multiple stages allow for different levels of heating or cooling. For example, a two-stage heating system may involve the use of a furnace and a heat pump. At a low heating stage, only the heat pump operates; at a high heating stage, both the heat pump and the furnace operate. Similarly, a two-stage cooling system may involve the use of two compressors. At a low cooling stage, only one of the compressors operates; at a high cooling stage, both compressors operate. In this way, as demand increases, the multiple stage unit can respond by bringing extra capacity online to meet the demand.

Multiple stage systems can use their multiple levels of heating or cooling to save energy. Much like a dimmer on a light switch, the multiple stages allow the system to adjust the level of heating or cooling based on the current circumstances (e.g., outside temperature). As a result, they can use the lowest level of heating or cooling needed and only use higher levels when circumstances require them.

Various HVAC equipment manufacturers have therefore developed multiple-stage systems to meet market demands. However, many manufacturers do not build their own thermostats for use with their equipment. Instead, these manufacturers rely on other thermostat manufacturers to deliver multiple-stage thermostats for use with their equipment. As a result, HVAC equipment manufacturers often have no control over what signals they will receive from the thermostats that they use.

As with many single-stage American thermostats, many multiple stage American thermostats simply provide a simple ON/OFF signal to indicate when different cooling or heating stages are required. For example, two-stage American thermometer may provide four signals: a first-stage cooling signal, a second-stage cooling signal, a first-stage heating signal, and a second-stage heating signal. The first-stage cooling signal will be ON and the other three signals will be OFF when the parameters at the thermostat indicates that the HVAC system should be cooling an area using first-stage cooling; the second-stage cooling signal will be ON and at least the two heating signals will be OFF when the parameters at the thermostat indicates that the HVAC system should be cooling an area using second-stage cooling; the first-stage heating signal will be ON and the other three signals will be OFF when the parameters at the thermostat indicates that the HVAC system should be cooling an area using first-stage heating; and the second-stage heating signal will be ON and at least the two cooling signals will be OFF when the parameters at the thermostat indicates that the HVAC system should be heating an area using second-stage heating.

The information provided by these signals is therefore relatively simple. As a result, conventional multiple-stage HVAC systems often rapidly switch between stages when operating on the border between two stages (e.g., near a temperature threshold). This can cause HVAC equipment to be repeatedly turned on and off in a short time period, lowering the overall efficiency of the entire system.

It would therefore be desirable to provide a system and a method for controlling a multiple-stage HVAC unit that allows for more granularity in the operation of the HVAC unit.

SUMMARY

A method for controlling a heating, ventilating, and air conditioning (HVAC) unit, is provided, including: receiving a first thermostat input from a thermostat; setting a current mode of the HVAC unit to a heating mode when a heating signal is enabled in the first thermostat input, or to a cooling mode when a cooling signal is enabled in the first thermostat input; setting a current capacity percentage of the HVAC unit to a first capacity percentage based on the first thermostat input; calculating a first room heating/cooling change rate based on first temperature data received from the HVAC unit; comparing the first room heating/cooling change rate with a first threshold; maintaining the HVAC unit at the first capacity percentage if the first room heating/cooling change rate is equal to the first threshold; lowering the current capacity percentage by a first cooling increment, to a minimum of 0% if the first room heating/cooling change rate is above the first threshold; and raising the current capacity percentage by a second cooling increment, to a maximum of 100%, if the first room heating/cooling change rate is below the first threshold.

The operations of receiving a first thermostat input, the setting of the current mode of the HVAC unit, the setting of the HVAC unit to the first capacity percentage, the calculating of the first room heating/cooling change rate, the comparing of the first room heating/cooling change rate with the first threshold, the maintaining of the current capacity percentage, the lowering of the current capacity, and the raising of the current capacity percentage may be repeated a plurality of times.

The first room heating/cooling change rate may be equal to a current room temperature change rate if the current mode is the heating mode, and the first room heating/cooling change rate may be equal to the current room temperature change rate multiplied by −1 if the current mode is the cooling mode.

The first capacity percentage may be between 1-50%, inclusive. The first cooling increment may be between 5-20%, inclusive, and the second cooling increment may be between 5-20%, inclusive.

The first cooling increment may be a first function of the first cooling threshold and the first room heating/cooling change rate, and the second cooling increment may be a second function of the first cooling threshold and the first room heating/cooling change rate.

The method may further include: receiving a second thermostat input from the thermostat; setting a current mode of the HVAC unit to a heating mode when a heating signal is enabled in the second thermostat input, or to a cooling mode when a cooling signal is enabled in the second thermostat input; setting the current capacity percentage of the HVAC unit to a second capacity percentage different than the first capacity percentage based on the second thermostat input; calculating a second room heating/cooling change rate based on second temperature data received from the HVAC unit; comparing the second room heating/cooling change rate with a second threshold; maintaining the current capacity percentage if the second temperature change rate is equal to the second threshold; lowering the current capacity percentage by a third cooling increment, to a minimum of 0%, if the second room heating/cooling change rate is above the second threshold; and raising the current capacity percentage by a fourth cooling increment, to a maximum of 100%, if the second room heating/cooling change rate is below the second threshold.

The operations of receiving a second thermostat input, the setting of the current mode of the HVAC unit, the setting of the HVAC unit to the second capacity percentage, the calculating of the second room heating/cooling change rate, the comparing of the second room heating/cooling change rate with the second threshold, the maintaining of the current capacity percentage, the lowering of the current capacity percentage, and the raising of the current capacity percentage may be repeated a plurality of times.

The second room heating/cooling change rate may be equal to the current room temperature change rate if the current mode is the heating mode, and the second room heating/cooling change rate may be equal to the current room temperature change rate multiplied by −1 if the current mode is the cooling mode.

The second capacity percentage may be between 50-100%, inclusive. The third cooling increment may be between 5-20%, inclusive, and the fourth cooling increment may be between 5-20%, inclusive.

The third cooling increment may be a first function of the second cooling threshold and the second temperature change rate, and the fourth cooling increment may be a second function of the second cooling threshold and the second temperature change rate.

The method may further include: receiving an off indicator from the thermostat after either maintaining the current capacity, lowering the current capacity, or raising the current capacity; setting a current room temperature as a set point temperature for the HVAC to maintain in the current mode; waiting for a first timeout period for further signals from the thermostat; receiving only the off indicator from the thermostat during the first timeout period; setting the HVAC unit to a minimum capacity percentage in the current mode; waiting for a second timeout period for further signals from the thermostat; receiving only the off indicator from the thermostat during the second timeout period; and turning off the HVAC unit.

The method may further include: receiving an off indicator from the thermostat after either maintaining the current capacity, lowering the current capacity, or raising the current capacity; setting a current room temperature as a set-point temperature for the HVAC to maintain; receiving a third thermostat input from the thermostat during a first timeout period; setting the current mode of the HVAC unit to a heating mode when a heating signal is enabled in the third thermostat input, or to a cooling mode when a cooling signal is enabled in the third thermostat input; setting the current capacity percentage of the HVAC unit to a third capacity percentage based on the third thermostat input value; calculating a third room heating/cooling change rate based on third temperature data received from the HVAC unit; comparing the third room heating/cooling change rate with a third threshold; maintaining the current capacity percentage if the third room heating/cooling change rate is equal to the third threshold; lowering the current capacity percentage by a fifth cooling increment, to a minimum of 0%, if the third room heating/cooling change rate is above the third threshold; and raising the current capacity percentage by a sixth cooling increment, to a maximum of 100%, if the third room heating/cooling change rate is above the third threshold.

The method may further include: comparing the first room heating/cooling change rate with a first threshold and a fourth threshold; maintaining the current capacity percentage if the first room heating/cooling change rate is between the first threshold and the fourth threshold, inclusive; lowering the current capacity by the first cooling increment, to a minimum of 0%, if the first room heating/cooling change rate is above the first threshold; and raising the current capacity by a second cooling increment, to a maximum of 100%, if the first room heating/cooling change rate is below the fourth threshold.

A method for controlling a heating, ventilating, and air conditioning (HVAC) unit as provided, including: receiving a first thermostat input from a thermostat; setting a current mode of the HVAC unit to a heating mode when a heating signal is enabled in the first thermostat input, or to a cooling mode when a cooling signal is enabled in the first thermostat input; setting a current capacity percentage of the HVAC unit to a first capacity based on the first thermostat input; receiving an off indicator from the thermostat after setting the current mode of the HVAC unit; setting a current room temperature as a set point temperature for the HVAC to maintain in the current mode; waiting for a first timeout period for further signals from the thermostat; receiving only the off indicator from the thermostat during the first timeout period; setting the current capacity percentage of the HVAC unit to a minimum capacity in the current mode after receiving only the off value from the thermostat during the first timeout period; waiting for a second timeout period for further signals from the thermostat; receiving only the off indicator from the thermostat during the second timeout period; and turning off the HVAC unit after receiving only the off indicator from the thermostat during the second timeout period.

The first timeout period may be between 0-30 minutes, the second timeout period may be between 0-30 minutes, and at least one of the first and second timeout periods may be above zero.

A non-transitory computer-readable medium is provided including instructions for execution by a computer, the instructions including a computer-implemented method for providing a method for controlling a heating, ventilating, and air conditioning (HVAC) unit, the instructions for implementing: receiving a first thermostat input from a thermostat; setting a current mode of the HVAC unit to a heating mode when a heating signal is enabled in the first thermostat input, or to a cooling mode when a cooling signal is enabled in the first thermostat input; setting a current capacity percentage of the HVAC unit to a first capacity percentage based on the first thermostat input; calculating a first room heating/cooling change rate based on first temperature data received from the HVAC unit; comparing the first room heating/cooling change rate with a first threshold; maintaining the HVAC unit at the first capacity percentage if the first room heating/cooling change rate is equal to the first threshold; lowering the current capacity percentage by a first cooling increment, to a minimum of 0%, if the first room heating/cooling change rate is above the first threshold; and raising the current capacity percentage by a second cooling increment, to a maximum of 100%, if the first room heating/cooling change rate is below the first threshold.

The instructions may be for further implementing: receiving a second thermostat input from the thermostat; setting a current mode of the HVAC unit to a heating mode when a heating signal is enabled in the second thermostat input, or to a cooling mode when a cooling signal is enabled in the second thermostat input; setting the current capacity percentage of the HVAC unit to a second capacity percentage different than the first capacity percentage based on the second thermostat input; calculating a second room heating/cooling change rate based on second temperature data received from the HVAC unit; comparing the second room heating/cooling change rate with a second threshold; maintaining the current capacity percentage if the second temperature change rate is equal to the second threshold; lowering the current capacity percentage by a third cooling increment, to a minimum of 0%, if the second room heating/cooling change rate is above the second threshold; and raising the current capacity percentage by a fourth cooling increment, to a maximum of 100%, if the second room heating/cooling change rate is below the second threshold.

The instructions may be for further implementing: receiving an off indicator from the thermostat after either maintaining the current capacity, lowering the current capacity, or raising the current capacity; setting a current room temperature as a set point temperature for the HVAC to maintain in the current mode; waiting for a first timeout period for further signals from the thermostat; receiving only the off indicator from the thermostat during the first timeout period; setting the HVAC unit to a minimum capacity percentage in the current mode; waiting for a second timeout period for further signals from the thermostat; receiving only the off indicator from the thermostat during the second timeout period; and turning off the HVAC unit.

The instructions may be for further implementing: receiving an off indicator from the thermostat after either maintaining the current capacity, lowering the current capacity, or raising the current capacity; setting a current room temperature as a set point temperature for the HVAC to maintain; receiving a third thermostat input from the thermostat during a first timeout period; setting the current mode of the HVAC unit to a heating mode when a heating signal is enabled in the third thermostat input, or to a cooling mode when a cooling signal is enabled in the third thermostat input; setting the current capacity percentage of the HVAC unit to a third capacity percentage based on the third thermostat input; calculating a third room heating/cooling change rate based on third temperature data received from the HVAC unit; comparing the third room heating/cooling change rate with a third threshold; maintaining the current capacity percentage if the third room heating/cooling change rate is equal to the third threshold; lowering the current capacity percentage by a fifth cooling increment, to a minimum of 0%, if the third room heating/cooling change rate is above the third threshold; and raising the current capacity percentage by a sixth cooling increment, to a maximum of 100%, if the third room heating/cooling change rate is above the third threshold.

The first room heating/cooling change rate may be equal to the current room temperature change rate if the current mode is the heating mode, and the first room heating/cooling change rate may be equal to the current room temperature change rate multiplied by −1 if the current mode is the cooling mode.

The first cooling increment may be a first function of the first cooling threshold and the first room heating/cooling change rate, and the second cooling increment may be a second function of the first cooling threshold and the first room heating/cooling change rate.

The second room heating/cooling change rate may be equal to the current room temperature change rate if the current mode is the heating mode, and the second room heating/cooling change rate may be equal to the current room temperature change rate multiplied by −1 if the current mode is the cooling mode.

The third cooling increment may be a first function of the second cooling threshold and the second room heating/cooling change rate, and the fourth cooling increment may be a second function of the second cooling threshold and the second room heating/cooling change rate.

The instructions may be for further implementing: receiving an off indicator from the thermostat after either maintaining the current capacity, lowering the current capacity, or raising the current capacity; setting a current room temperature as a set point temperature for the HVAC to maintain in the current mode; waiting for a first timeout period for further signals from the thermostat; receiving only the off indicator from the thermostat during the first timeout period; setting the HVAC unit to a minimum capacity percentage in the current mode; waiting for a second timeout period for further signals from the thermostat; receiving only the off indicator from the thermostat during the second timeout period; and turning off the HVAC unit.

The instructions may be for further implementing: receiving an off indicator from the thermostat after either maintaining the current capacity, lowering the current capacity, or raising the current capacity; setting a current room temperature as a set point temperature for the HVAC to maintain; receiving a third thermostat input from the thermostat during a first timeout period; setting the current mode of the HVAC unit to a heating mode when a heating signal is enabled in the third thermostat input, or to a cooling mode when a cooling signal is enabled in the third thermostat input; setting the current capacity percentage of the HVAC unit to a third capacity percentage based on the third thermostat input; calculating a third room heating/cooling change rate based on third temperature data received from the HVAC unit; comparing the third room heating/cooling change rate with a third threshold; maintaining the current capacity percentage if the third room heating/cooling change rate is equal to the third threshold; lowering the current capacity percentage by a fifth cooling increment, to a minimum of 0%, if the third room heating/cooling change rate is above the third threshold; and raising the current capacity percentage by a sixth cooling increment, to a maximum of 100%, if the third room heating/cooling change rate is above the third threshold.

The instructions may be for further implementing: comparing the first room heating/cooling change rate with a first threshold and a fourth threshold; maintaining the current capacity percentage if the first room heating/cooling change rate is between the first threshold and the fourth threshold, inclusive; lowering the current capacity by the first cooling increment, to a minimum of 0%, if the first room heating/cooling change rate is above the first threshold; and raising the current capacity by a second cooling increment, to a maximum of 100%, if the first room heating/cooling change rate is below the fourth threshold.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention.

DETAILED DESCRIPTION

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. Likewise, the use of positional terms such as front, back, side, top, and bottom are used solely to provide a reference point for one particular orientation, and to enhance clarity. Their use does not imply that such an orientation is required. In operation, the disclosed air handling units can be used in any desired orientation.

HVAC System

Figure 1:
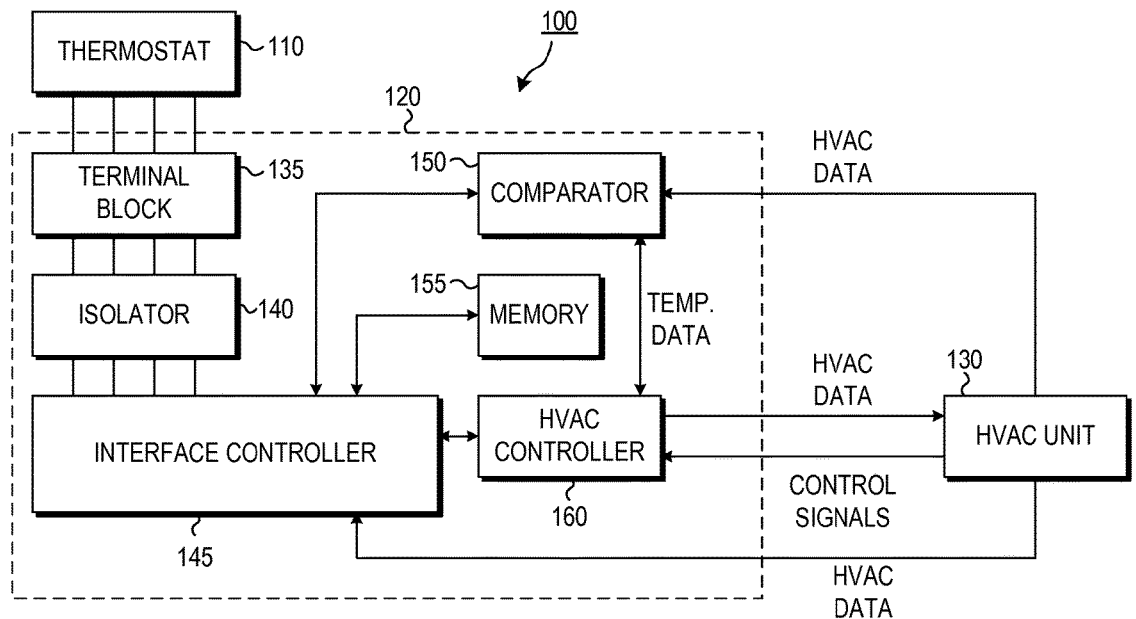
FIG. 1 is a block diagram of an HVAC system according to disclosed embodiments.

FIG. 1 is a block diagram of an HVAC system 100 according to disclosed embodiments. As shown in FIG. 1, the HVAC system 100 includes thermostat 110, an HVAC interface 120, and an HVAC unit 130. The HVAC unit 130 includes a terminal block 135, an isolator 140, an interface controller 145, a comparator 150, a memory 155, and an HVAC controller 160.

The thermostat 110 is a four-stage thermostat (i.e., two-stage cooling and two-stage heating) configured to provide four possible staging signals for controlling the HVAC unit 130: a first-stage cooling signal, a first-stage, a second-stage cooling signal, a first-stage heating signal, and a second-stage heating signal. Each of these staging signals is a simple ON/OFF signal, and the thermostat 110 only provides one staging signal at a time in the ON state. For the purposes of this disclosure, a staging signal will be considered to have been output, and later received only when it is in the ON state. If the thermostat 110 does not output any staging signal (i.e., all of these staging signals are in the OFF state), this is an indication by the thermostat that the HVAC unit 130 should be turned off.

The HVAC interface 120 operates as an interface between the thermostat 110 and the HVAC unit 130. It receives signals from the thermostat 110 including the four staging signals, and uses these staging signals to control the operation of the HVAC unit 130.

The HVAC unit 130 is a variable capacity HVAC device configured to provide heating or cooling, depending upon whether it is in a heating mode or in a cooling mode. In either mode, the HVAC unit 130 can operate at a current capacity percentage between 0% and 100%. This current capacity percentage represents what percentage of maximum possible heating or maximum possible cooling is being provided.

For example, if the HVAC unit 130 had a maximum possible cooling potential of 20,000 BTUH, it would provide the 20,000 BTUH at a 100% cooling capacity percentage. However, if it were set to a current capacity percentage of 75% in a cooling mode, it would only provide 15,000

BTUH cooling capacity. Likewise, if it were set to a current capacity percentage of 25% in a cooling mode, it would only provide 5000 BTUH cooling capacity. The same would be true for heating capacity as a function of heating capacity percentage.

The terminal block 135 operates to receive the heating and cooling signals from the thermostat 110.

The isolator 140 operates to isolate the voltages provided at the terminal block 135 from the remainder of the HVAC interface 120.

The interface controller 145 is configured to control the operation of the HVAC interface 120, specifically the operation of the comparator 150, the memory 155, and the HVAC controller 160. It operates in response to the staging signals received from the thermostat 110 via the terminal block 135 and the isolator 140.

The comparator 150 is configured to compare the number with a threshold value and determine whether it is equal to the threshold value, greater than the threshold value, or less than the threshold value. It is used to compare a room cooling change rate ($dT_C$) with a cooling threshold ($T_C$) or a room heating change rate ($dT_H$) with a heating threshold ($T_H$).

The memory 155 is configured to store the instructions for operating the interface controller 145 and the HVAC controller 160, as well as a plurality of temperature values provided by the HVAC unit 130.

The HVAC controller 160 is configured to control the operation of the HVAC unit 130. In particular, it can instruct the HVAC unit 130 as to whether it should be in a heating or cooling mode; it can instruct the HVAC unit 130 to maintain a particular temperature; it can control a current capacity percentage of the HVAC unit 130; and it can instruct the HVAC unit 130 to turn on and to turn off.

The functions of the interface controller 145, the comparator 150, and the HVAC controller 160 can be carried out by a microprocessor, an application-specific instruction set processor (ASIP), a programmable logic device (PLD), or the like.

Method of Operating an HVAC System

Figure 2:
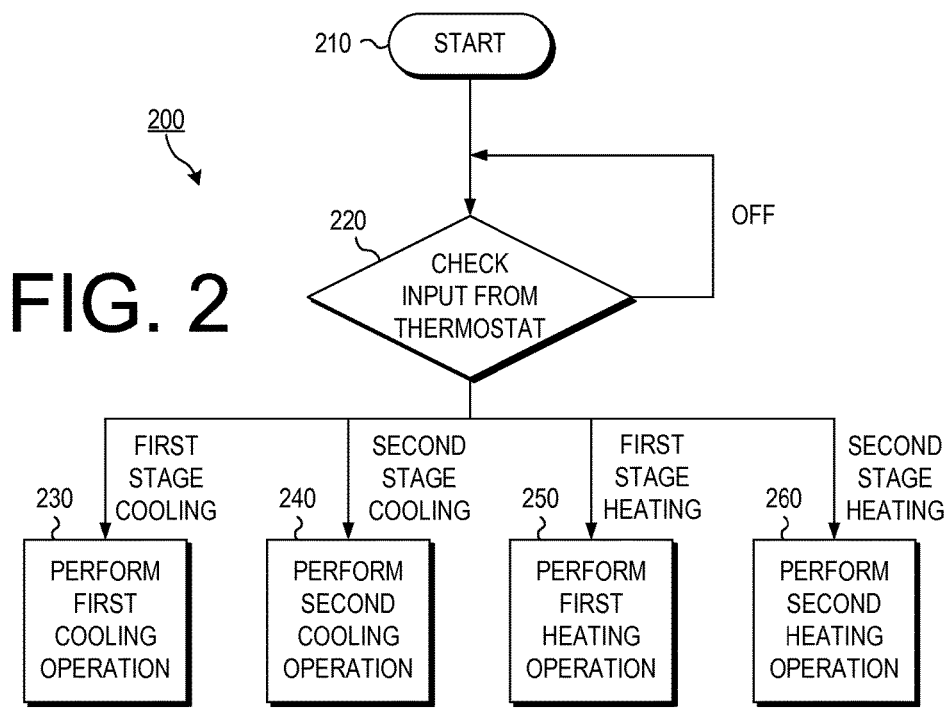
FIG. 2 is a flow chart of the overall operation of the HVAC interface of FIG. 1 according to disclosed embodiments.

FIG. 2 is a flow chart 200 of the overall operation of the HVAC interface 120 of FIG. 1 according to disclosed embodiments. In the disclosed embodiments, the thermostat 110 operates using two-stage cooling and two-stage heating. As a result, the thermostat 110 provides at least four ON/OFF signals: a first-stage cooling signal, a second-stage cooling signal, a first-stage heating signal, and a second-stage heating signal. The thermostat 110 enables (i.e., turns on) one of these four signals to indicate in what stage the HVAC unit 130 should operate. If the thermostat 110 does not enable any of the four staging signals, it is an indication that the HVAC unit 130 should be turned off.

As shown in FIG. 2, after the process starts (210), the HVAC interface 120 receives an input signal from the thermostat 110 and checks its value (220). If the value of the input from the thermostat indicates that the HVAC unit 130 should be turned off (i.e., none of these staging signals are enabled) then the HVAC interface 130 does nothing, and continues to check the value of the input signal received from the thermostat 110 (220).

If the first-stage cooling signal from the thermostat 110 is enabled, the HVAC interface 120 performs the first cooling operation (230); if the second-stage cooling signal from the thermostat 110 is enabled, the HVAC interface 120 performs the second cooling operation (240); if the first-stage heating signal from the thermostat 110 is enabled, the HVAC interface 120 performs the first heating operation (250); and if the second-stage heating signal from the thermostat 110 is enabled, the HVAC interface 120 performs the second heating operation (260). The first cooling operation (230), the second cooling operation (240), the first heating operation (250), and the second heating operation (260) are described in detail in FIGS. 3-6.

First Cooling Operation

Figure 3:
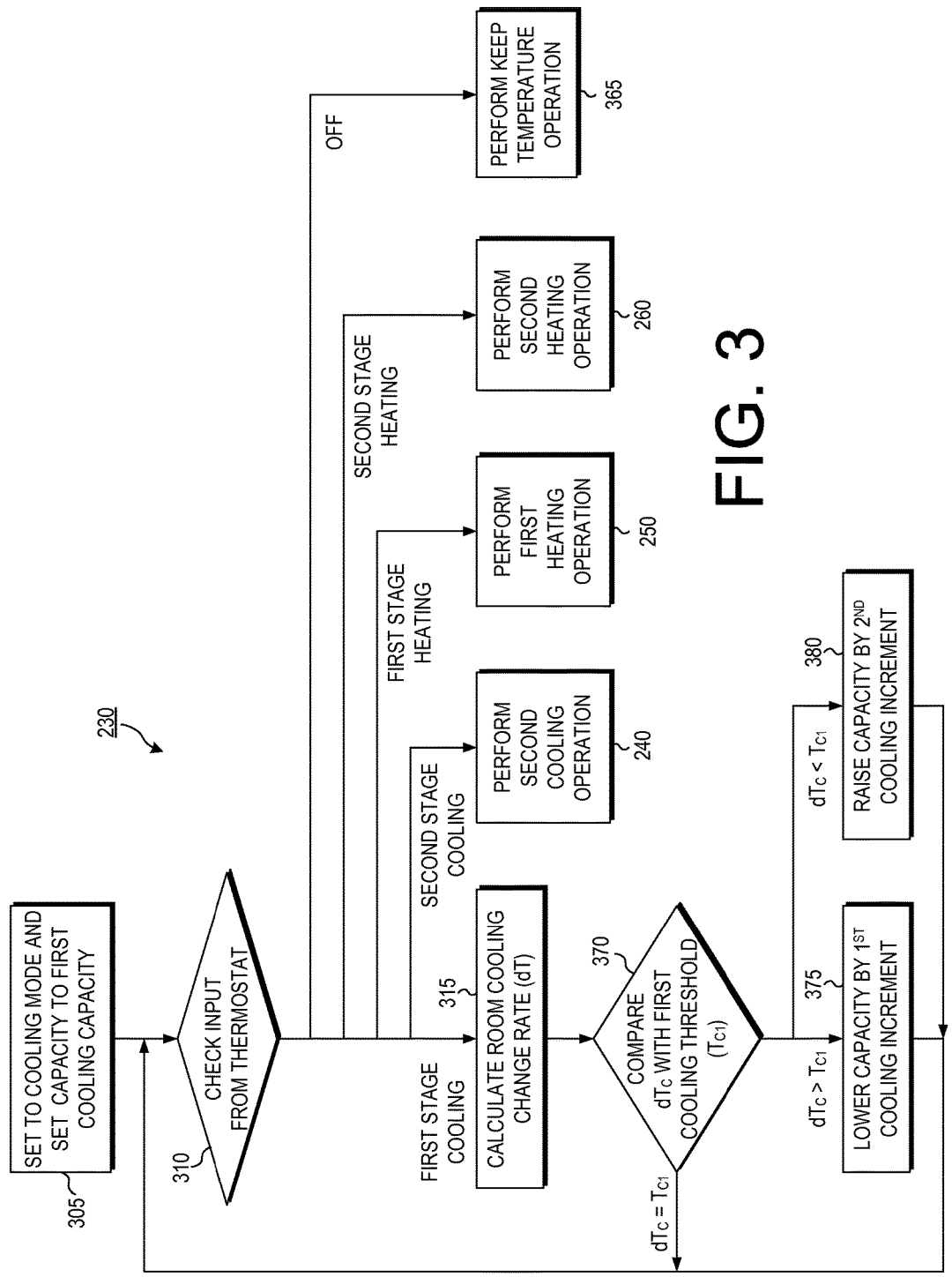
FIG. 3 is a flow chart of the first cooling operation of FIG. 1 according to disclosed embodiments.

FIG. 3 is a flow chart of the first cooling operation 230 of FIG. 1 according to disclosed embodiments. The first cooling operation 230 represents a lower power cooling operation, appropriate for when relatively little cooling is needed (e.g., the temperature differential between inside and outside is not great). Typically, a thermostat 110 will enable a first-stage cooling signal when it determines that a relatively low amount of cooling will be required.

As shown in FIG. 3, the first cooling operation 230 begins with the HVAC interface 120 instructing the HVAC unit 130 to enter a cooling mode, and to set its current capacity percentage to a first cooling capacity percentage (305). This first cooling capacity percentage can be any desired value, but is typically within the range of 0%-50%, inclusive. In one particular embodiment, the first cooling capacity percentage is set to 40%.

After setting the HVAC unit 130 to the cooling mode, and setting its current capacity percentage to the first cooling capacity percentage (305), the HVAC interface 120 again checks to see what signals are enabled by the thermostat 110 (310).

If the second-stage cooling signal from the thermostat 110 is enabled, the HVAC interface 120 performs the second cooling operation (240); if the first-stage heating signal from the thermostat 110 is enabled, the HVAC interface 120 performs the first heating operation (250); if the second-stage heating signal from the thermostat 110 is enabled, the HVAC interface 120 performs the second heating operation (260); and if the thermostat 110 does not enable any signal (i.e., the HVAC interface 120 receives an indication that the HVAC unit 130 should be turned off), the HVAC interface 120 performs a keep temperature operation 365.

If, however, the thermostat 110 continues to enable the first-stage cooling signal, the HVAC interface 120 proceeds to calculate a room cooling change rate ($dT_C$) that indicates the rate at which the room is cooling (315). The room cooling change rate ($dT_C$) is determined based on a current room temperature (provided to the HVAC interface 120 from the HVAC unit 130), and a number of stored room temperatures from previous points in time, e.g., stored in the memory 155.

One way to calculate the room cooling change rate ($dT_C$) is to have the HVAC interface 120 determine a line that best fits the current and stored temperature values, and then determine the slope of this line. The room temperature change rate will be that slope. Then, in order to keep heating and cooling operations similar, the slope of the line is then multiplied by $-1$ to get the room cooling change rate ($dT_C$), so that the rate of cooling is indicated by a positive value. This can be seen, by way of example, in FIGS. 9-11 below.

Once the room cooling change rate ($dT_C$) has been calculated, the HVAC interface 120 compares the room cooling change rate ($dT_C$) with a first cooling threshold ($T_{C1}$), e.g., using the comparator 150 (370). The first cooling threshold ($T_{C1}$) indicates a desired room cooling change rate for the first cooling operation. It can be visualized as the slope of a line that represents a desired rate of cooling (multiplied by $-1$ to provide a positive value for increased cooling). By comparing the room cooling change rate ($dT_C$) with the first cooling threshold ($T_{C1}$), the HVAC interface 120 can determine whether the HVAC unit is cooling an area slower than desired, quicker than desired, or exactly as desired.

If the room cooling change rate ($dT_C$) is equal to the first cooling threshold ($T_{C1}$) (i.e., $dT_C=T_{C1}$), then the room cooling change rate ($dT_C$) is exactly at a desired value. This means that the HVAC unit 130 is operating precisely at a desired capacity. In this case, the HVAC interface 120 does nothing, but returns to again check which staging signal is enabled by the thermostat 110 (310). The HVAC interface 120 may delay this check by a delay time (e.g., 0-90 seconds) in some embodiments.

If the room cooling change rate ($dT_C$) is greater than the first cooling threshold ($T_{C1}$) (i.e., $dT_C>T_{C1}$), then the room cooling change rate ($dT_C$) is higher than a desired value. This means that the HVAC unit 130 is operating at a higher capacity than is desired, and is cooling an area too quickly. In this case, the HVAC interface 120 lowers the current capacity percentage by a first cooling increment (375), down to a minimum of 0%, and then returns to again check which staging signal is enabled by the thermostat 110 (after the delay time, in some embodiments) (310).

By reducing the current capacity percentage by the first cooling increment (375), the HVAC interface 120 causes the HVAC unit 130 to cool the area less quickly, and moves the room cooling change rate ($dT_C$) closer to its desired value.

If the room cooling change rate ($dT_C$) is less than the first cooling threshold ($T_{C1}$) (i.e., $dT_C<T_{C1}$), then the room cooling change rate ($dT_C$) is lower than a desired value. This means that the HVAC unit 130 is operating at a lower capacity than is desired, and is cooling an area too slowly. In this case, the HVAC interface 120 raises the current capacity percentage by a second cooling increment (380), up to a maximum of 100%, and then returns to again check which staging signal is enabled by the thermostat 110 (after the delay time, in some embodiments) (310).

By increasing the current capacity percentage by the second cooling increment (380), the HVAC interface 120 causes the HVAC unit 130 to cool the area more quickly, and moves the room cooling change rate ($dT_C$) closer to its desired value.

The first and second cooling increments are generally lower than the first cooling capacity percentage, and are typically in a range between 1%-25%, inclusive. In one disclosed embodiment, the first and second cooling increments are both 10%. However, the first and second cooling increments need not be identical. In some alternate embodiments the HVAC interface 130 could correct the current capacity percentage more quickly in one direction than in the other.

Furthermore, in alternate embodiments the first and second cooling increments need not be constant values. For example, in some alternate embodiments, the first and second cooling increments can be a function of the room cooling change rate ($dT_C$) and the first cooling threshold ($T_{C1}$). Other functions are possible as well.

By performing these adjustments to the current capacity percentage during the first cooling operation, the HVAC interface 120 can better and more efficiently maintain a desired temperature in an area, despite the fact that only a single ON/OFF first-stage cooling signal is enabled, without any granularity.

Second Cooling Operation

Figure 4:
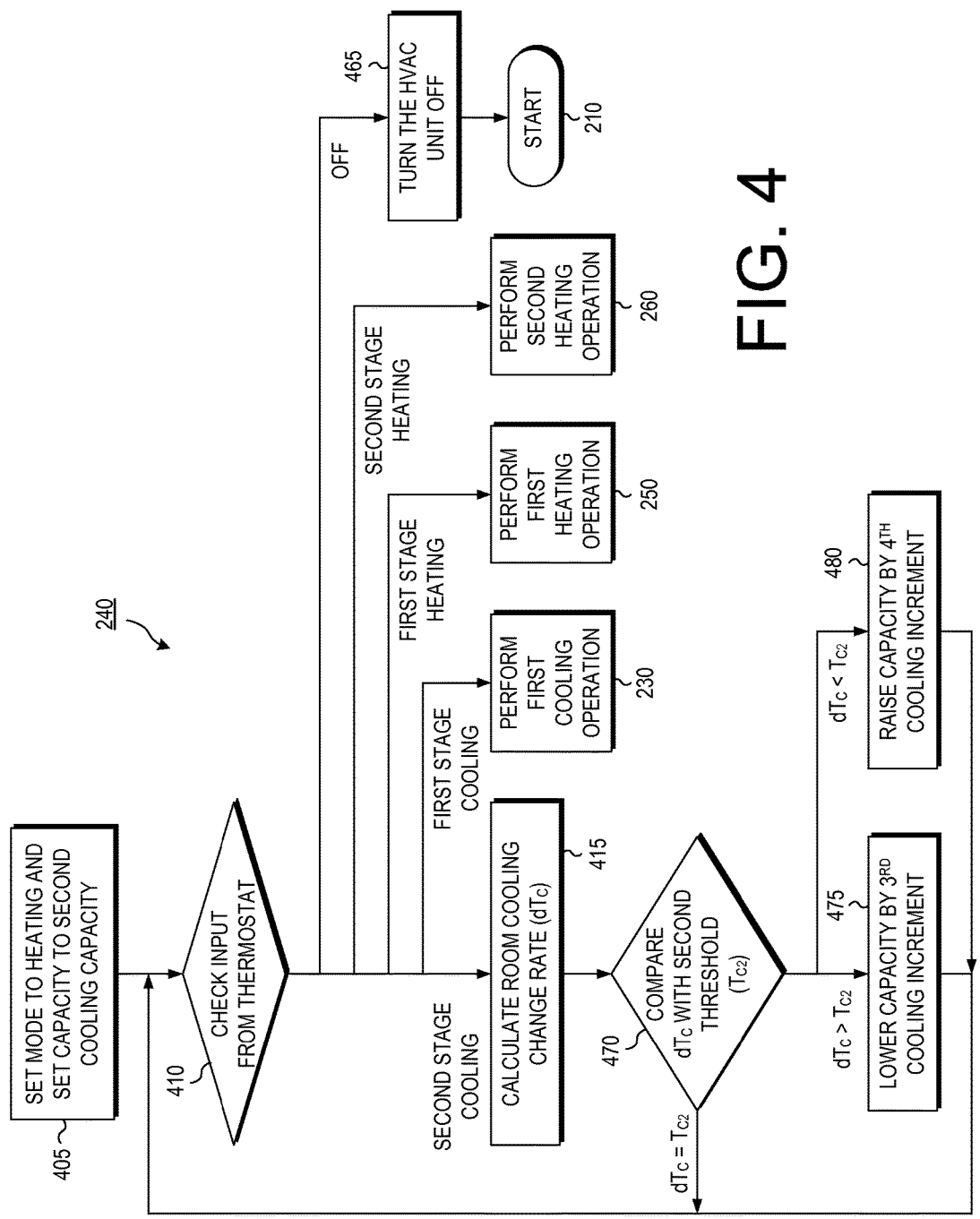
FIG. 4 is a flow chart of the second cooling operation of FIG. 1 according to disclosed embodiments.

FIG. 4 is a flow chart of the second cooling operation of FIG. 1 according to disclosed embodiments. The second cooling operation 240 represents a higher power cooling operation, appropriate for when a large amount of cooling is needed (e.g., the temperature differential between inside and outside is very great). Typically, a thermostat 110 will enable a second-stage cooling signal when it determines that a relatively high amount of cooling will be required.

As shown in FIG. 4, the second cooling operation 240 begins with the HVAC interface 120 instructing the HVAC unit 130 to enter a cooling mode, and to set its current capacity percentage to a second cooling capacity percentage (405). This second cooling capacity percentage can be any desired value, but is larger than the first cooling capacity percentage, and is typically within the range of 50%-100%, inclusive. In one particular embodiment, the first cooling capacity percentage is set to 70%.

After setting the HVAC unit 130 to the cooling mode, and setting its current capacity percentage to the second cooling capacity percentage (405), the HVAC interface 120 again checks to see what input signal is enabled by the thermostat 110 (410).

If the first-stage cooling signal from the thermostat 110 is enabled, the HVAC interface 120 performs the first cooling operation (230); if the first-stage heating signal from the thermostat 110 is enabled, the HVAC interface 120 performs the first heating operation (250); if the second-stage heating signal from the thermostat 110 is enabled, the HVAC interface 120 performs the second heating operation (260); and if the thermostat 110 does not enable any signal (i.e., the HVAC interface 120 receives an indication that the HVAC unit 130 should be turned off), the HVAC interface 120 turns the HVAC unit 230 off (465).

If, however, the thermostat 110 continues to enable the second-stage cooling signal, the HVAC interface 120 proceeds to calculate a room cooling change rate ($dT_C$) that indicates the rate at which the room is cooling (415). The room cooling change rate ($dT_C$) is determined based on a current room temperature (provided to the HVAC interface 120 from the HVAC unit 130), and a number of stored room temperatures from previous points in time, e.g. stored in the memory 155.

As noted above, one way to calculate the room cooling change rate ($dT_C$) is to have the HVAC interface 120 determine a line that best fits the current and stored temperature values, and then determine the slope of this line. The slope of this line will be the room temperature change rate (dT). Then, in order to keep heating and cooling operations similar, the slope of the line is then multiplied by −1 to get the room cooling change rate ($dT_C$), so that the rate of cooling is indicated by a positive value. This can be seen, by way of example, in FIGS. 9-11 below.

Once the room cooling change rate ($dT_C$) has been calculated, the HVAC interface 120 compares the room cooling change rate ($dT_C$) with a second cooling threshold ($T_{C2}$), e.g., using the comparator 150 (470). The second cooling threshold ($T_{C2}$) indicates a desired room cooling change rate for the second cooling operation. It can be visualized as the slope of a line that represents a desired rate of cooling (multiplied by −1 to provide a positive value for increased cooling). By comparing the room cooling change rate ($dT_C$) with the second cooling threshold ($T_{C2}$), the HVAC interface 120 can determine whether the HVAC unit is cooling an area slower than desired, quicker than desired, or exactly as desired.

If the room cooling change rate ($dT_C$) is equal to the second cooling threshold ($T_{C2}$) (i.e., $dT_C=T_{C2}$), then the room cooling change rate ($dT_C$) is exactly at a desired value. This means that the HVAC unit 130 is operating precisely at a desired capacity. In this case, the HVAC interface 120 does nothing, but returns to again check which staging signal is enabled by the thermostat 110 (410). The HVAC interface 120 may delay this check by a delay time (e.g., 0-90 seconds) in some embodiments.

If the room cooling change rate ($dT_C$) is greater than the second cooling threshold ($T_{C2}$) (i.e., $dT_C > T_{C2}$), then the room cooling change rate ($dT_C$) is higher than a desired value. This means that the HVAC unit 130 is operating at a higher capacity than is desired, and is cooling an area too quickly. In this case, the HVAC interface 120 lowers the current capacity percentage by a third cooling increment (475), down to a minimum of 0%, and then returns to again check which staging signal is enabled by the thermostat 110 (after the delay time, in some embodiments) (410).

By reducing the current capacity percentage by the third cooling increment (475), the HVAC interface 120 causes the HVAC unit 130 to cool the area less quickly, and moves the room cooling change rate ($dT_C$) closer to its desired value.

If the room cooling change rate ($dT_C$) is less than the second cooling threshold ($T_{C2}$) (i.e., $dT_C < T_{C2}$), then the room cooling change rate ($dT_C$) is lower than a desired value. This means that the HVAC unit 130 is operating at a lower capacity than is desired, and is cooling an area too slowly. In this case, the HVAC interface 120 raises the current capacity percentage by a fourth cooling increment (480), up to a maximum of 100%, and then returns to again check which staging signal is enabled by the thermostat 110 (after the delay time, in some embodiments) (410).

By increasing the current capacity percentage by the fourth cooling increment (480), the HVAC interface 120 causes the HVAC unit 130 to cool the area more quickly, and moves the room cooling change rate ($dT_C$) closer to its desired value.

The third and fourth cooling increments are generally lower than the second cooling capacity percentage, and are typically in a range between 1%-25%, inclusive. In one disclosed embodiment, the third and fourth cooling increments are both 10%. However, the third and fourth cooling increments need not be identical. In some alternate embodiments the HVAC interface 130 could correct the current capacity percentage more quickly in one direction than in the other.

Furthermore, in alternate embodiments the third and fourth cooling increments need not be constant values. For example, in some alternate embodiments, the third and fourth cooling increments can be a function of the room cooling change rate ($dT_C$) and the second cooling threshold ($T_{C2}$). Other functions are possible as well.

By performing these adjustments to the current capacity percentage during the second cooling operation, the HVAC interface 120 can better and more efficiently maintain a desired temperature in an area, despite the fact that only a single ON/OFF second-stage cooling signal is enabled, without any granularity.

First Heating Operation

Figure 5:
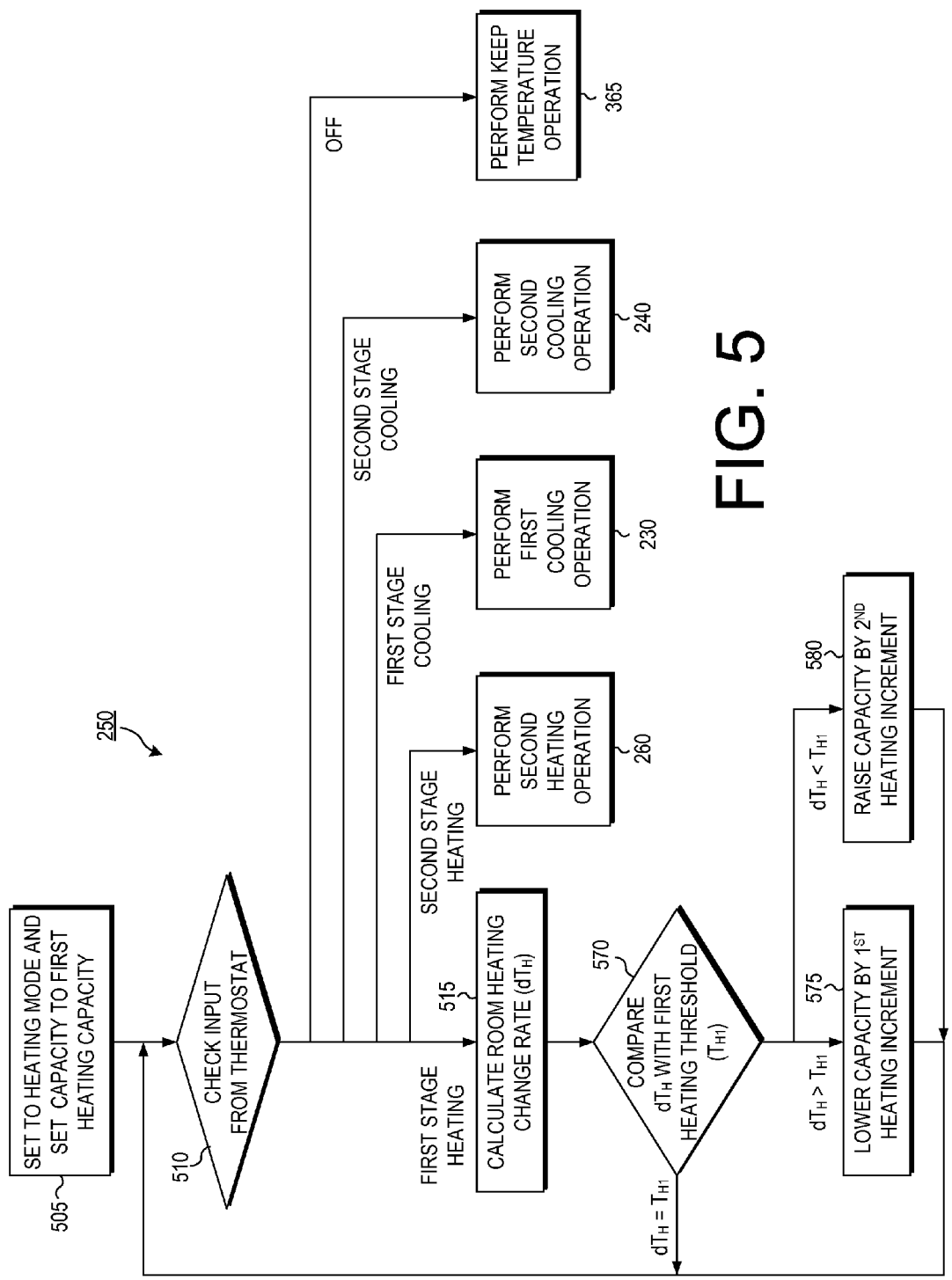
FIG. 5 is a flow chart of the first heating operation of FIG. 1 according to disclosed embodiments.

FIG. 5 is a flow chart of the first heating operation 250 of FIG. 1 according to disclosed embodiments. The first heating operation 250 represents a lower power heating operation, appropriate for when relatively little heating is needed (e.g., the temperature differential between inside and outside is not very great). Typically, a thermostat 110 will enable a first-stage heating signal when it determines that a relatively low amount of heating will be required.

As shown in FIG. 5, the first heating operation 250 begins with the HVAC interface 120 instructing the HVAC unit 130 to enter a heating mode, and to set its current capacity percentage to a first heating capacity percentage (505). This first heating capacity percentage can be any desired value, but is typically within the range of 0%-50%, inclusive. In one particular embodiment, the first heating capacity percentage is set to 40%.

After setting the HVAC unit 130 to the heating mode, and setting its current capacity percentage to the first heating capacity percentage (505), the HVAC interface 120 again checks to see which input signal is enabled by the thermostat 110 (510).

If the second-stage heating signal from the thermostat 110 is enabled, the HVAC interface 120 performs the second heating operation (260); if the first-stage cooling signal from the thermostat 110 is enabled, the HVAC interface 120 performs the first cooling operation (230); if the second-stage cooling signal from the thermostat 110 is enabled, the HVAC interface 120 performs the second cooling operation (240); and if the thermostat 110 does not enable any signal (i.e., the HVAC interface 120 receives an indication that the HVAC unit 130 should be turned off), the HVAC interface 120 performs the keep temperature operation 365.

If, however, the thermostat 110 continues to enable the first-stage heating signal, the HVAC interface 120 proceeds to calculate a room heating change rate ($dT_H$) that indicates the rate at which the room is heating (515). The room heating change rate ($dT_H$) is determined based on a current room temperature (provided to the HVAC interface 120 from the HVAC unit 130), and a number of stored room temperatures from previous points in time, e.g. stored in the memory 155.

One way to calculate the room heating change rate ($dT_H$) is to have the HVAC interface 120 determine a line that best fits the current and stored temperature values, and then determine the room heating change rate ($dT_H$) to be the slope of this line. This can be seen, by way of example, in FIGS. 12-14 below.

Once the room heating change rate ($dT_H$) has been calculated, the HVAC interface 120 compares the room heating change rate ($dT_H$) with a first heating threshold ($T_{H1}$), e.g., using the comparator 150 (570). The first heating threshold ($T_{H1}$) indicates a desired room heating change rate for the first heating operation 250. This value can be visualized as the slope of a line that represents a desired rate of heating. By comparing the room heating change rate ($dT_H$) with the first heating threshold ($T_{H1}$), the HVAC interface 120 can determine whether the HVAC unit is heating an area slower than desired, quicker than desired, or exactly as desired.

If the room heating change rate ($dT_H$) is equal to the first heating threshold ($T_{H1}$) (i.e., $dT_H = T_{H1}$), then the room heating change rate ($dT_H$) is exactly at a desired value. This means that the HVAC unit 130 is operating precisely at a desired capacity. In this case, the HVAC interface 120 does nothing, but returns to again check which staging signal is enabled by the thermostat 110 (510). The HVAC interface 120 may delay this check by a delay time (e.g., 0-90 seconds) in some embodiments.

If the room heating change rate ($dT_H$) is greater than the first heating threshold ($T_{H1}$) (i.e., $dT_H > T_{H1}$), then the room heating change rate ($dT_H$) is higher than a desired value. This means that the HVAC unit 130 is operating at a higher capacity than is desired, and is heating an area too quickly. In this case, the HVAC interface 120 lowers the current capacity percentage by a first heating increment (575), down to a minimum of 0%, and then returns to again check which staging signal is enabled by the thermostat 110 (after the delay time, in some embodiments) (510).

By reducing the current capacity percentage by the first heating increment (575), the HVAC interface 120 causes the HVAC unit 130 to heat the area less quickly, and moves the room heating change rate ($dT_H$) closer to its desired value.

If the room heating change rate ($dT_H$) is less than the first heating threshold ($T_{H1}$) (i.e., $dT_H < T_{H1}$), then the room heating change rate ($dT_H$) is lower than a desired value. This means that the HVAC unit 130 is operating at a lower capacity than is desired, and is heating an area too slowly. In this case, the HVAC interface 120 raises the current capacity percentage by a second heating increment (580), up to a maximum of 100%, and then returns to again check which staging signal is enabled by the thermostat 110 (after the delay time, in some embodiments) (510).

By increasing the current capacity percentage by the second heating increment (580), the HVAC interface 120 causes the HVAC unit 130 to heat the area more quickly, and moves the room heating change rate ($dT_H$) closer to its desired value.

The first and second heating increments are generally lower than the first heating capacity percentage, and are typically in a range between 1%-25%, inclusive. In one disclosed embodiment, the first and second heating increments are both 10%. However, the first and second heating increments need not be identical. In some embodiments the HVAC interface 130 could correct the current capacity percentage more quickly in one direction than in the other.

Furthermore, in alternate embodiments the first and second heating increments need not be constant values. For example, in some alternate embodiments, the first and second heating increments can be a function of the room heating change rate ($dT_H$) and the first heating threshold ($T_{H1}$). Other functions are possible as well By performing these adjustments to the current capacity percentage during the first heating operation 250, the HVAC interface 120 can better and more efficiently maintain a desired temperature in an area, despite the fact that only a single ON/OFF first-stage heating signal is enabled, without any granularity.

Second Heating Operation

Figure 6:
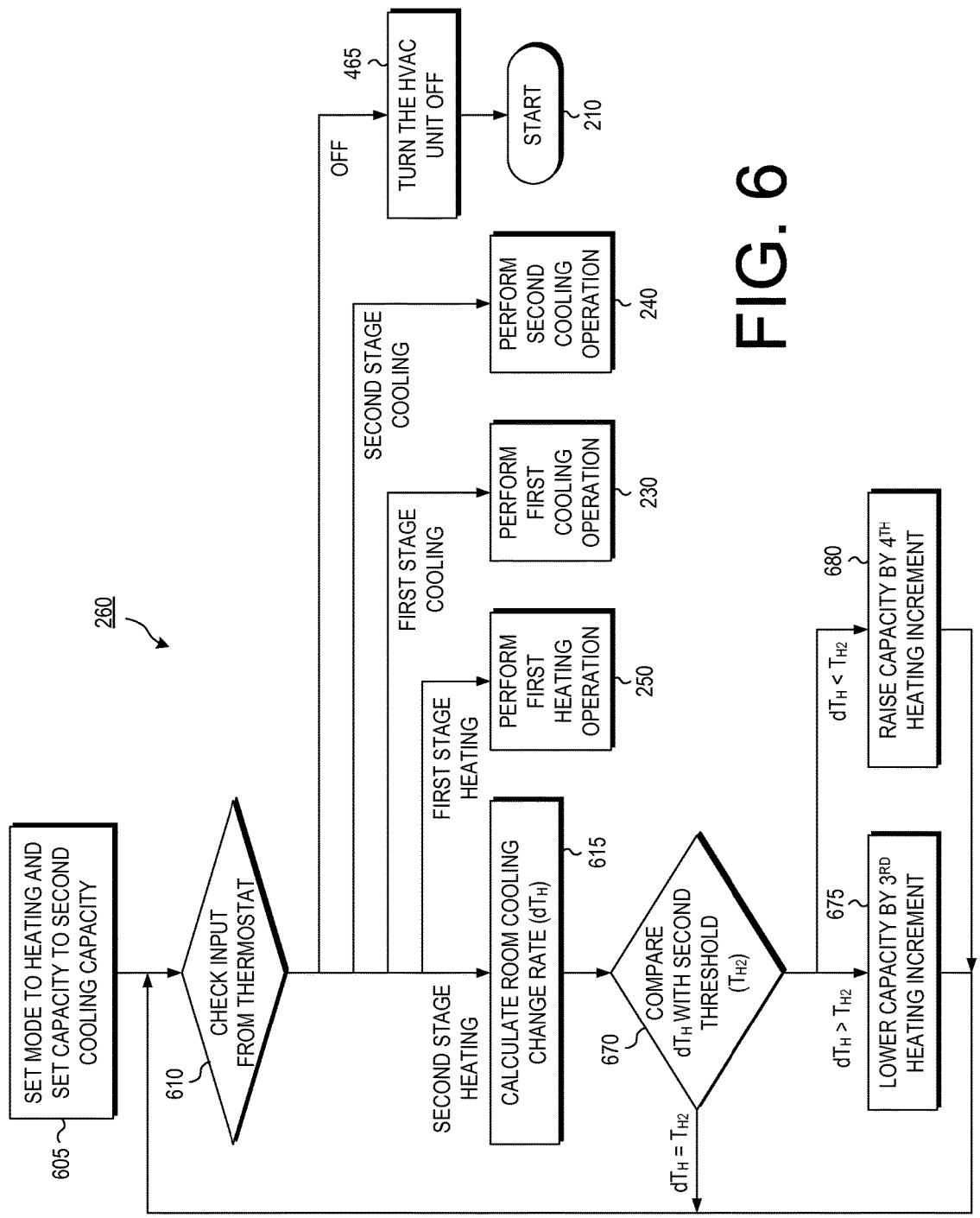
FIG. 6 is a flow chart of the second heating operation of FIG. 1 according to disclosed embodiments.

FIG. 6 is a flow chart of the second heating operation 260 of FIG. 1 according to disclosed embodiments. The second heating operation 260 represents a higher power heating operation, appropriate for when a large amount of heating is needed (e.g., the temperature differential between inside and outside is very great). Typically, a thermostat 110 will enable a second-stage heating signal when it determines that a relatively high amount of heating will be required.

As shown in FIG. 6, the second heating operation 260 begins with the HVAC interface 120 instructing the HVAC unit 130 to enter a heating mode, and to set its current capacity percentage to a second heating capacity percentage (605). This second heating capacity percentage can be any desired value, but is larger than the first heating capacity percentage, and is typically within the range of 50%-100%, inclusive. In one particular embodiment, the first heating capacity percentage is set to 70%.

After setting the HVAC unit 130 to the heating mode, and setting its current capacity percentage to the second heating capacity percentage (605), the HVAC interface 120 again checks to see what input signal it is receiving from the thermostat 110 (610).

If the first-stage heating signal from the thermostat 110 is enabled, the HVAC interface 120 performs the first heating operation (250); if the first-stage cooling signal from the thermostat 110 is enabled, the HVAC interface 120 performs the first cooling operation (230); if the second-stage cooling signal from the thermostat 110 is enabled, the HVAC interface 120 performs the second cooling operation (240); and if the thermostat 110 does not enable any signal (i.e., the HVAC interface 120 receives an indication that the HVAC unit 130 should be turned off), the HVAC interface 120 turns the HVAC unit 230 off (465).

If, however, the thermostat 110 continues to enable the second-stage heating signal, HVAC interface 120 proceeds to calculate a room heating change rate ($dT_H$) that indicates the rate at which the room is heating (615). The room heating change rate ($dT_H$) is determined based on a current room temperature (provided to the HVAC interface 120 from the HVAC unit 130), and a number of stored room temperatures from previous points in time, e.g., stored in the memory 155.

As noted above, one way to calculate the room heating change rate ($dT_H$) is to have the HVAC interface 120 determine a line that best fits the current and stored temperature values, and then determine the room heating change rate ($dT_H$) to be the slope of this line. This can be seen, by way of example, in FIGS. 12-14 below.

Once the room heating change rate ($dT_H$) has been calculated, the HVAC interface 120 compares the room heating change rate ($dT_H$) with a second heating threshold ($T_{H2}$), e.g., using the comparator 150 (670). The second heating threshold ($T_{H2}$) indicates a desired room heating change rate for the second heating operation. The second heating threshold ($T_{H2}$) can be visualized as the slope of a line that represents a desired rate of heating. By comparing the room heating change rate ($dT_H$) with the second heating threshold ($T_{H2}$), the HVAC interface 120 can determine whether the HVAC unit is heating an area slower than desired, quicker than desired, exactly as desired.

If the room heating change rate ($dT_H$) is equal to the second heating threshold ($T_{H2}$) (i.e., $dT_H = T_{H2}$), then the room heating change rate ($dT_H$) is exactly at a desired value. This means that the HVAC unit 130 is operating precisely at a desired capacity. In this case, the HVAC interface 120 does nothing, but returns to again check which staging signal is enabled by the thermostat 110 (610). The HVAC interface 120 may delay this check by a delay time (e.g., 0-90 seconds) in some embodiments.

If the room heating change rate ($dT_H$) is greater than the second heating threshold ($T_{H2}$) (i.e., $dT_H > T_{H2}$), then the room heating change rate ($dT_H$) is higher than a desired value. This means that the HVAC unit 130 is operating at a higher capacity than is desired, and is heating an area too quickly. In this case, the HVAC interface 120 lowers the current capacity percentage by a third heating increment (675), down to a minimum of 0%, and then returns to again check which staging signal is enabled by the thermostat 110 (after the delay time, in some embodiments) (610).

By reducing the current capacity percentage by the third heating increment (675), the HVAC interface 120 causes the HVAC unit 130 to heat the area less quickly, and moves the room heating change rate ($dT_H$) closer to its desired value.

If the room heating change rate ($dT_H$) is less than the second heating threshold ($T_{H2}$) (i.e., $dT_H < T_{H2}$), then the room heating change rate ($dT_H$) is lower than a desired value.

This means that the HVAC unit 130 is operating at a lower capacity than is desired, and is heating an area too slowly. In this case, the HVAC interface 120 raises the current capacity percentage by a fourth heating increment (680), up to a maximum of 100%, and then returns to again check which staging signal is enabled by the thermostat 110 (after the delay time, in some embodiments) (610).

By increasing the current capacity percentage by the fourth heating increment (680), the HVAC interface 120 causes the HVAC unit 130 to heat the area more quickly, and moves the room heating change rate ($dT_H$) closer to its desired value.

The third and fourth heating increments are generally lower than the second heating capacity percentage, and are typically in a range between 1%-25%, inclusive. In one disclosed embodiment, the third and fourth heating increments are both 10%. However, the third and fourth heating increments need not be identical. In some embodiments the HVAC interface 130 could correct the current capacity percentage more quickly in one direction than in the other.

Furthermore, in alternate embodiments the third and fourth heating increments need not be constant values. For example, in some alternate embodiments, the third and fourth heating increments can be a function of the room heating change rate ($dT_H$) and the second heating threshold ($T_{H2}$). Other functions are possible as well By performing these adjustments to the current capacity percentage during the second heating operation, the HVAC interface 120 can better and more efficiently maintain a desired temperature in an area, despite the fact that only a single ON/OFF second-stage heating signal is enabled, without any granularity.

Keep Temperature Operation

When the HVAC interface 120 is performing the first cooling operation 230 or the first heating operation 250 and the thermostat 110 stops enabling any staging signals (i.e., the thermostat 110 indicates that the HVAC unit 130 should be turned off), the HVAC interface 120 does not immediately turn the HVAC unit 130 off. Rather, it instead performs a keep temperature operation 365, which maintains operation of the HVAC unit 130 for a short period of time.

Figure 7:
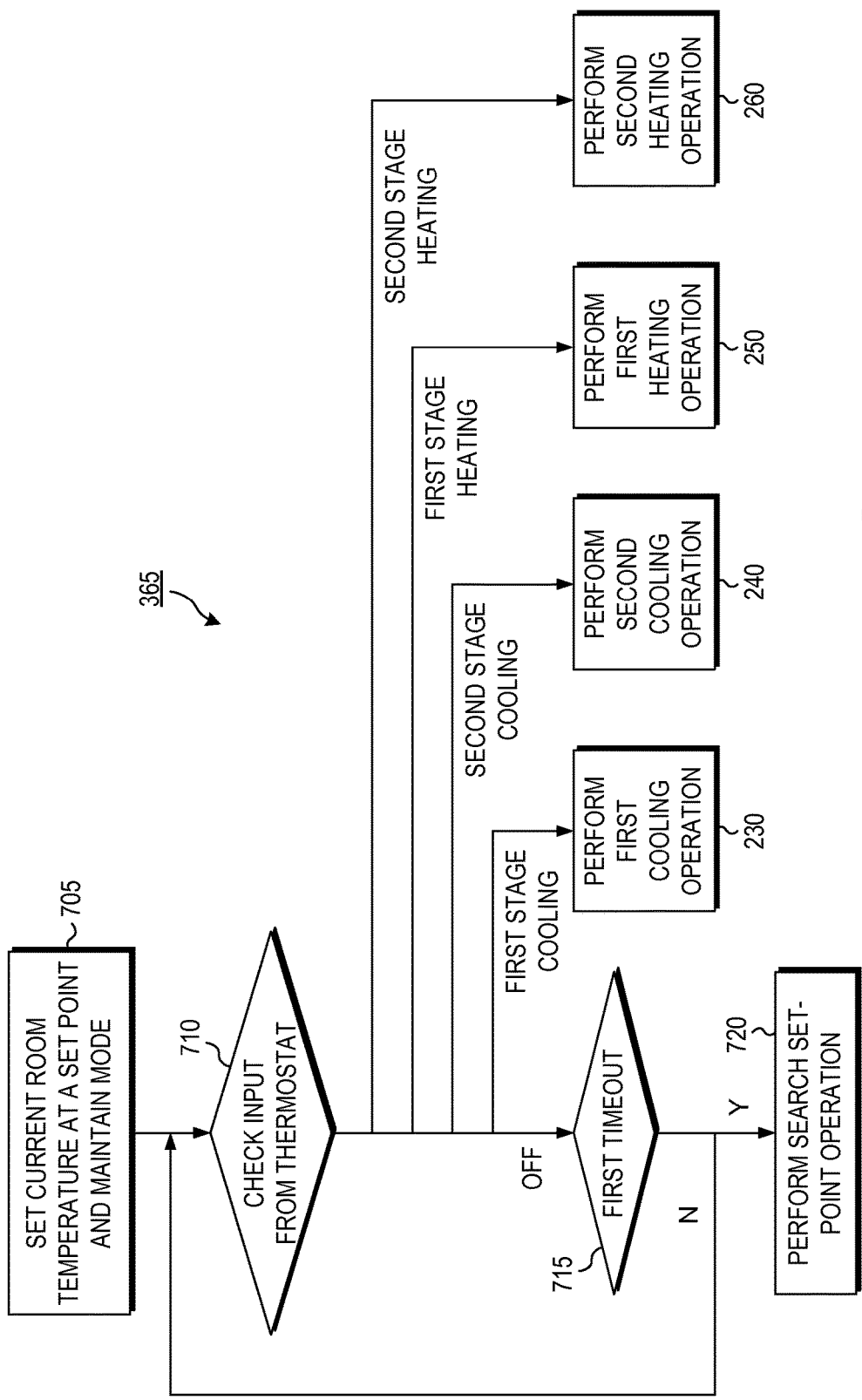
FIG. 7 is a flow chart of the keep temperature operation of FIG. 1 according to disclosed embodiments.

FIG. 7 is a flow chart of the keep temperature operation 365 of FIG. 1 according to disclosed embodiments. As shown in FIG. 7, the keep temperature operation 365 begins with the HVAC interface 120 instructing the HVAC unit 130 to set a current room temperature as a set-point, and to maintain its current mode (i.e., either a heating mode or a cooling mode) (705). The set point is a temperature which the HVAC unit 130 should maintain. This operation assumes that the HVAC unit 130 is sophisticated enough to be able to maintain a temperature when instructed to do so.

After setting the current room temperature as the set-point (705), the HVAC interface 120 again checks to see which staging signal, if any, is enabled by the thermostat 110 (710).

If the first-stage cooling signal from the thermostat 110 is enabled, the HVAC interface 120 performs the first cooling operation (230); if the second-stage cooling signal from the thermostat 110 is enabled, the HVAC interface 120 performs the second cooling operation (240); if the first-stage heating signal from the thermostat 110 is enabled, the HVAC interface 120 performs the first heating operation (250); and if the second-stage heating signal from the thermostat 110 is enabled, the HVAC interface 120 performs the second heating operation (260).

If, however, the thermostat 110 enables no staging signal (i.e., it continues to instruct the HVAC interface 120 to turn the HVAC unit 130 off), the HVAC interface 120 waits for a first timeout period to see if any staging signals are enabled (715), repeatedly checking the input received from the thermostat 110. If at any time during the first timeout period a staging signal is enabled, the HVAC interface 120 will act on that staging signal to perform the appropriate cooling or heating operation 230, 240, 250, 260.

If, however, it reaches the end of the first timeout period without a staging signal being enabled, the HVAC interface 120 will perform a search set-point operation (720).

The first timeout period can be set to any duration that will maintain a desired level of operation of the HVAC system 100. In some embodiments, the first timeout period is set to be between 0-30 minutes. In one particular embodiment the first timeout period can be set to one of 0, 5, 15, and 30 minutes. In various embodiments, the first timeout period may be set by the manufacturer or chosen by the user.

The keep temperature operation allows the HVAC system 100 to maintain its status quo while it waits to see if a new staging signal is enabled. Thus, rather than instructing the HVAC unit 130 to turn off immediately upon receiving the off indicator from the thermostat 110, the HVAC interface 120 keeps the HVAC unit 130 operating to maintain a current temperature for a short period of time. If the thermostat 110 enables a staging signal during this time, the HVAC unit 130 can resume operation without having to start up again from an off position. Moreover, it is likely that if the thermostat 110 enables a staging signal during the first timeout period, it will be a staging signal similar to what was previously provided. By maintaining the set point temperature, the HVAC unit 130 will most likely have maintained the cooling/eating area at a desired temperature.

However, the HVAC interface 120 does not keep the HVAC unit 130 operating forever, lest the user intended to turn the HVAC system 100 off. Once the first timeout period ends without any further staging signal being enabled, the HVAC interface 120 proceeds to perform the search set-point operation 720.

Search Set-Point Operation

Once the HVAC interface 120 has waited for the first timeout period without any staging signals being enabled, it becomes increasingly likely that this off indication from the thermostat 110 means that the HVAC unit 130 should be turned off. However, the HVAC interface 120 provides one additional stage to determine this, during which the HVAC unit 130 is set at a minimal operating condition.

Figure 8:
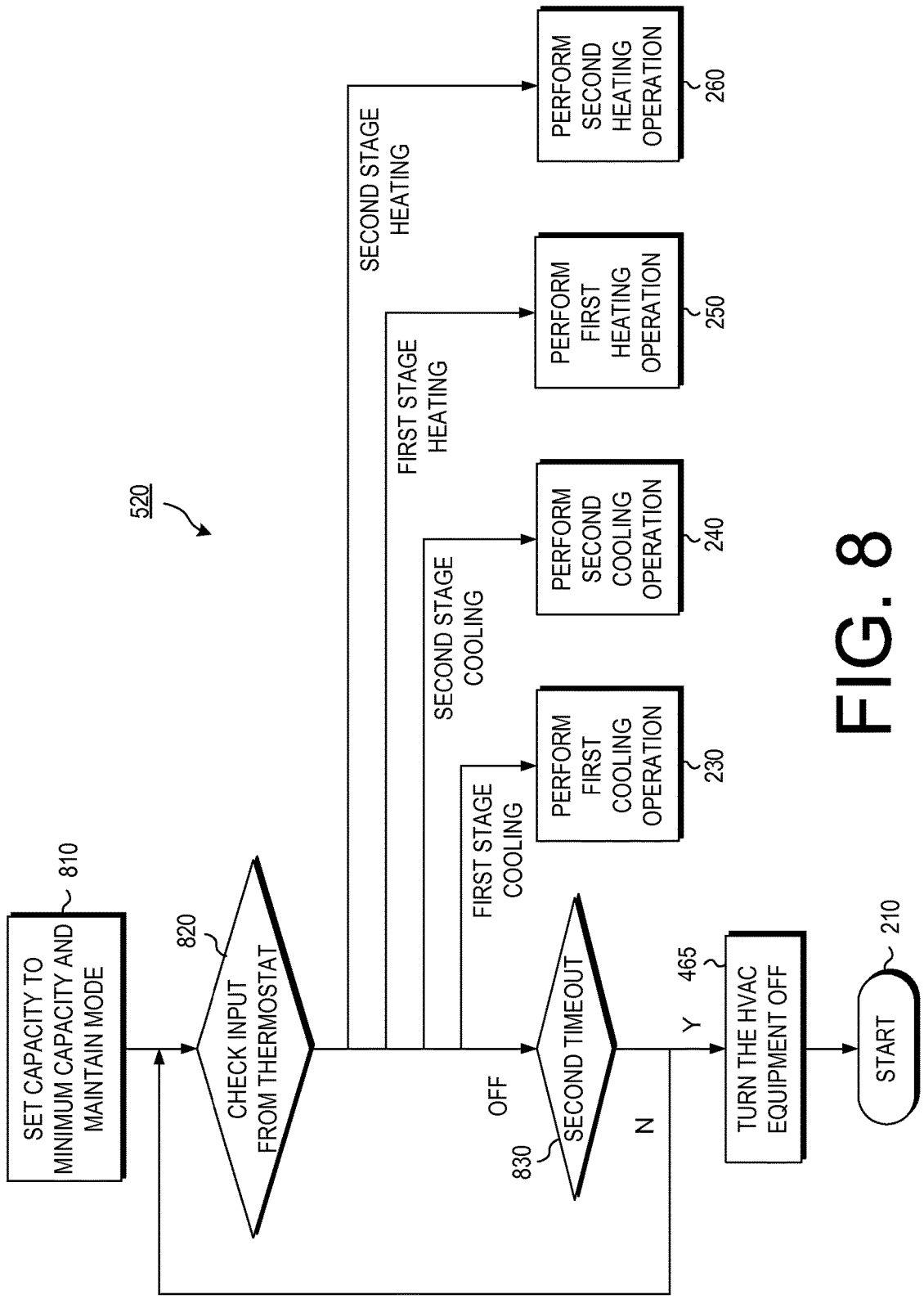
FIG. 8 is a flow chart of the search set-point operation of FIG. 1 according to disclosed embodiments.

FIG. 8 is a flow chart of the search set-point operation 720 of FIG. 7 according to disclosed embodiments. As shown in FIG. 8, the search set-point operation 720 begins with the HVAC interface 120 instructing the HVAC unit 130 to set a current capacity percentage to a minimum capacity percentage, and to maintain its current mode (i.e., either a heating mode or a cooling mode) (805). The minimum capacity percentage is a capacity percentage lower than the first capacity percentage, but which will keep the HVAC unit 130 operating in its current mode.

After setting the current capacity percentage to the minimum capacity percentage (810), the HVAC interface 120 again checks to see which staging signal, if any, is enabled by the thermostat 110 (820).

If the first-stage cooling signal from the thermostat 110 is enabled, the HVAC interface 120 performs the first cooling operation (230); if the second-stage cooling signal from the thermostat 110 is enabled, the HVAC interface 120 performs the second cooling operation (240); if the first-stage heating signal from the thermostat 110 is enabled, the HVAC interface 120 performs the first heating operation (250); and if the second-stage heating signal from the thermostat 110 is enabled, the HVAC interface 120 performs the second heating operation (260).

If, however, no staging signal is enabled (i.e., the thermostat 110 continues to instruct the HVAC interface 120 to turn the HVAC unit 130 off), the HVAC interface 120 waits for a second timeout period to see if any staging signals are enabled (830), repeatedly checking the input received from the thermostat 110. If at any time during the second timeout period a staging signal is enabled, it will act on that staging signal to perform the appropriate cooling or heating operation 230, 240, 250, 260.

If, however, the HVAC interface 120 reaches the end of the second timeout period without staging signal being enabled, it will finally turn the HVAC unit off (465).

The second timeout period can be set to any duration that will maintain a desired level of operation of the HVAC system 100, and this duration may be different from the first timeout period. In some embodiments, the first timeout period is set to be between 0-30 minutes. In one particular embodiment the first timeout period can be set to one of 0, 5, 15, and 30 minutes. In various embodiments, the first timeout period may be set by the manufacturer or chosen by the user.

The search set-point operation allows the HVAC system 100 to maintain the HVAC unit 130 in a minimal operation mode while it waits to see if a new staging signal is enabled. Thus, rather than simply instructing the HVAC unit 130 to turn off, the HVAC interface 120 keeps the HVAC unit 130 operating at a very low capacity percentage to maintain some heating or cooling for a short period of time. If the thermostat 110 provides a staging signal during this time, the HVAC unit 130 can resume operation without having to start the HVAC unit 130 up again from an off position.

However, as with the keep temperature operation, the HVAC interface 120 does not keep the HVAC unit 130 operating in this minimum capacity percentage mode forever, lest the user intended to turn the HVAC system 100 off. Once the second timeout period ends without any further staging signal being enabled, the HVAC interface 120 will turn the HVAC unit 130 off. At this point, it is assumed that the off indicator received from the thermostat 110 is likely based on a user instruction to finally turn the HVAC unit 130 off.

One reason for performing the keep temperature operation 365 and the search set-point operation 720 instead of turning the HVAC unit 130 off is that during a first cooling operation 230 or a first heating operation 250, the amount of required cooling/heating can be very low. This means that the temperature of the area being cooled/heated may be achieved for short time period during a cooling or heating mode, causing the thermostat 110 to stop enabling staging signals requiring heating or cooling. However, without the HVAC unit 130 operating, the temperature of the area may drift from its desired temperature, requiring the HVAC unit 130 to be turned on again. This leads to the possibility of the HVAC unit 130 being repeatedly turned on and off, which is undesirable.

Nevertheless, it is possible that this off indicator from the thermostat 110 represents a genuine desire by a user to turn the HVAC unit 130 off. In order to lessen the possibility of undesirably shutting off the HVAC unit 130, while retaining a user's ability to instruct the HVAC unit 130 to turn off, the HVAC interface 120 performs the keep temperature operation 365 and the search set-point operation 720 prior to shutting down the HVAC unit 130 in response to an off indicator from the thermostat 110.

The reason that the HVAC unit 130 is turned off 465 in the second cooling operation or the second heating operation, rather than proceeding to the keep temperature operation 365, is that it is likely that an off indicator received during these two operations is indeed an instruction to turn the HVAC unit 130 off for an extended period of time. If the need for heating or cooling were simply reduced, even by a large amount, the thermostat 110 would be more likely to enable a first-stage cooling signal or a second-stage cooling signal rather than an off indicator.

Graphical Illustrations

Figure 9:
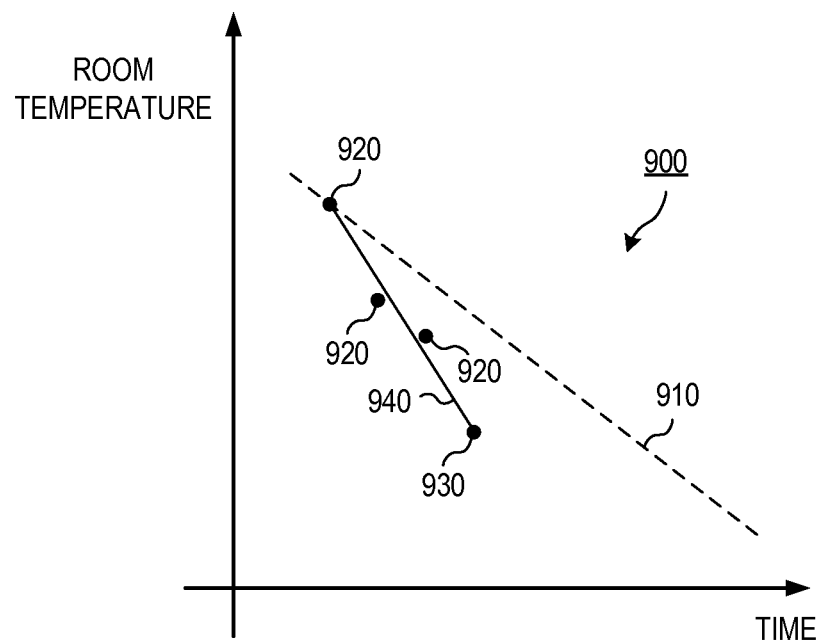
FIG. 9 is a graph showing aspects of a first or second cooling operation in which a current capacity percentage of the HVAC unit should be reduced, according to disclosed embodiments.

FIG. 9 is a graph showing aspects of a first or second cooling operation 230, 240 in which a current capacity percentage of the HVAC unit 130 should be reduced, according to disclosed embodiments. As shown in FIG. 9, graph 900 is of room temperature versus time and includes a line 910 that indicates a desired rate of temperature change. The slope of this line 910 represents a desired room temperature change rate (dT). The desired room temperature change rate multiplied by −1 indicates a desired room cooling change rate (desired $dT_C$). This desired room cooling change rate (desired $dT_C$) can be used as a first or second cooling threshold ($T_{C1}$ or $T_{C2}$), depending upon whether graph 900 represents a first cooling operation 230 or a second cooling operation 240.

Graph 900 also includes a plurality of previous temperature measurements 920 and a current temperature measurement 930. A best-fit line 940 can be determined based on these temperature measurements 920, 930. This line 940 represents the actual rate of temperature change in the area being cooled. The slope of this line 940 represents an actual room temperature change rate (dT). The actual room temperature change rate multiplied by −1 indicates an actual room cooling change rate ($dT_C$).

In the disclosed embodiment one current temperature measurement 930 and three previous temperature measurements 920 are provided. This is by way of example only. Alternate embodiments can use more or fewer previous temperature measurements 920.

As can be seen in FIG. 9, the magnitude of the slope of the actual room temperature change rate line 940 is greater than the magnitude of the slope of the desired temperature change rate line 910. This corresponds to a calculated room cooling change rate ($dT_C$) being greater than a first or second cooling threshold ($T_{C1}$ or $T_{C2}$). As shown in FIGS. 3 and 4, when this occurs, the current capacity percentage will be lowered by a corresponding cooling increment, down to a minimum of 0%.

In other words, when the actual room cooling change rate is greater than the desired cooling change rate, the HVAC interface 120 will lower the current capacity percentage of the HVAC unit 130, causing it to reduce the amount of cooling it provides to the area. This, in turn, will lessen the actual room cooling change rate, bringing it closer to the desired room cooling change rate.

Figure 10:
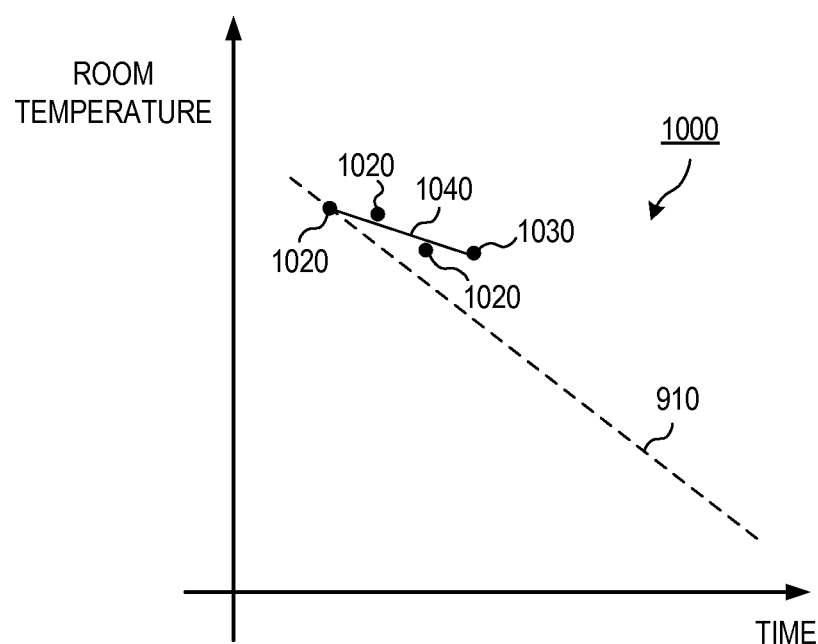
FIG. 10 is a graph showing aspects of a first or second cooling operation in which a current capacity percentage of the HVAC unit should be increased, according to disclosed embodiments.

FIG. 10 is a graph showing aspects of a first or second cooling operation in which a current capacity percentage of the HVAC unit should be increased, according to disclosed embodiments. As shown in FIG. 10, graph 1000 is of room temperature versus time and includes the line 910 that indicates a desired rate of temperature change. As noted above, the slope of this line 910 multiplied by −1 indicates a desired room cooling change rate (desired $dT_C$), which can be used as a first or second cooling threshold ($T_{C1}$ or $T_{C2}$), depending upon whether graph 1000 represents a first cooling operation 230 or a second cooling operation 240.

Graph 1000 also includes a plurality of previous temperature measurements 1020 and a current temperature measurement 1030. A best-fit line 1040 can be determined based on these temperature measurements 1020, 1030. This line 1040 represents the actual rate of temperature change in the area to be cooled. The slope of this line 1040 represents an actual room temperature change rate (dT). The actual room temperature change rate multiplied by −1 indicates an actual room cooling change rate ($dT_C$).

In the disclosed embodiment one current temperature measurement 1030 and three previous temperature measurements 1020 are provided. This is by way of example only. Alternate embodiments can use more or fewer previous temperature measurements 1020.

As can be seen in FIG. 10, the magnitude of the slope of the actual room temperature change rate line 1040 is less than the magnitude of the slope of the desired temperature change rate line 1010. This corresponds to a calculated room cooling change rate ($dT_C$) being less than a first or second cooling threshold ($T_{C1}$ or $T_{C2}$). As shown in FIGS. 3 and 4, when this occurs, the current capacity percentage will be raised by a corresponding cooling increment, up to a maximum of 100%.

In other words, when the actual room cooling change rate is less than the desired cooling change rate, the HVAC interface 120 will raise the current capacity percentage of the HVAC unit 130, causing it to increase the amount of cooling it provides to the area. This, in turn, will increase the actual room cooling change rate, bringing it closer to the desired room cooling change rate.

Figure 11:
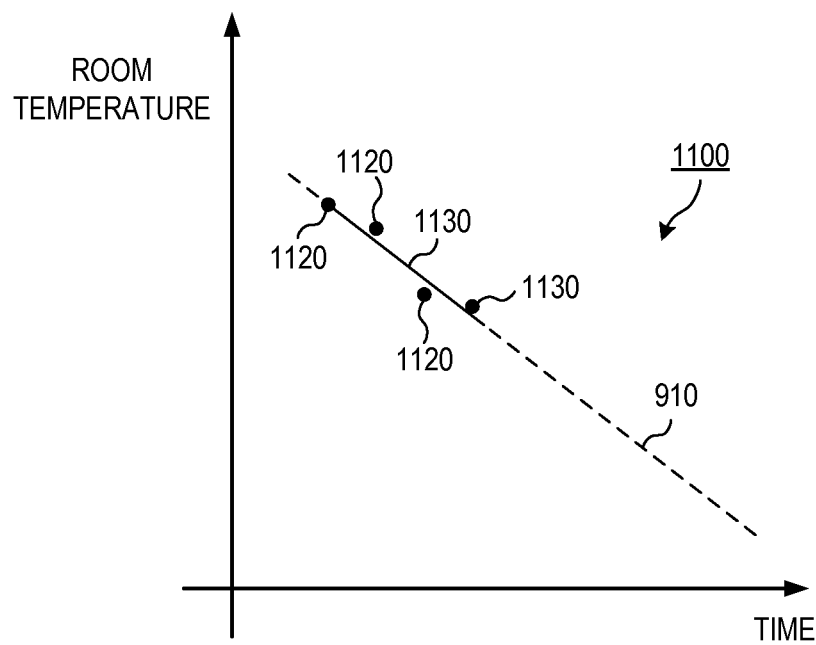
FIG. 11 is a graph showing aspects of a first or second cooling operation in which a current capacity percentage of the HVAC unit should be maintained, according to disclosed embodiments.

FIG. 11 is a graph showing aspects of a first or second cooling operation 230, 240 in which a current capacity percentage of the HVAC unit 130 should be maintained, according to disclosed embodiments. As shown in FIG. 11, graph 1100 is of room temperature versus time and includes the line 910 that indicates a desired rate of temperature change. As noted above, the slope of this line 910 multiplied by −1 indicates a desired room cooling change rate (desired $dT_C$), which can be used as a first or second cooling threshold ($T_{C1}$ or $T_{C2}$), depending upon whether graph 1100 represents a first cooling operation 230 or a second cooling operation 240.

Graph 1100 also includes a plurality of previous temperature measurements 1120 and a current temperature measurement 1130. A best-fit line 1140 can be determined based on these temperature measurements 1120, 1130. This line 1140 represents the actual rate of temperature change in the area to be cooled. The slope of this line 1140 represents an actual room temperature change rate (dT). The actual room temperature change rate multiplied by −1 indicates an actual room cooling change rate ($dT_C$).

In the disclosed embodiment one current temperature measurement 1130 and three previous temperature measurements 1120 are provided. This is by way of example only. Alternate embodiments can use more or fewer previous temperature measurements 1120.

As can be seen in FIG. 11, the magnitude of the slope of the actual room temperature change rate line 1040 is equal to the magnitude of the slope of the desired temperature change rate line 1010. This corresponds to a calculated room cooling change rate ($dT_C$) being equal to a first or second cooling threshold ($T_{C1}$ or $T_{C2}$). As shown in FIGS. 3 and 4, when this occurs, the current capacity percentage will be maintained.

In other words, when the actual room cooling change rate is equal to the desired cooling change rate, the HVAC interface 120 will maintain the current capacity percentage of the HVAC unit 130. Since the HVAC unit 130 is cooling the area at the desired rate, there is no need to change the current capacity percentage of the HVAC unit 130.

Figure 12:
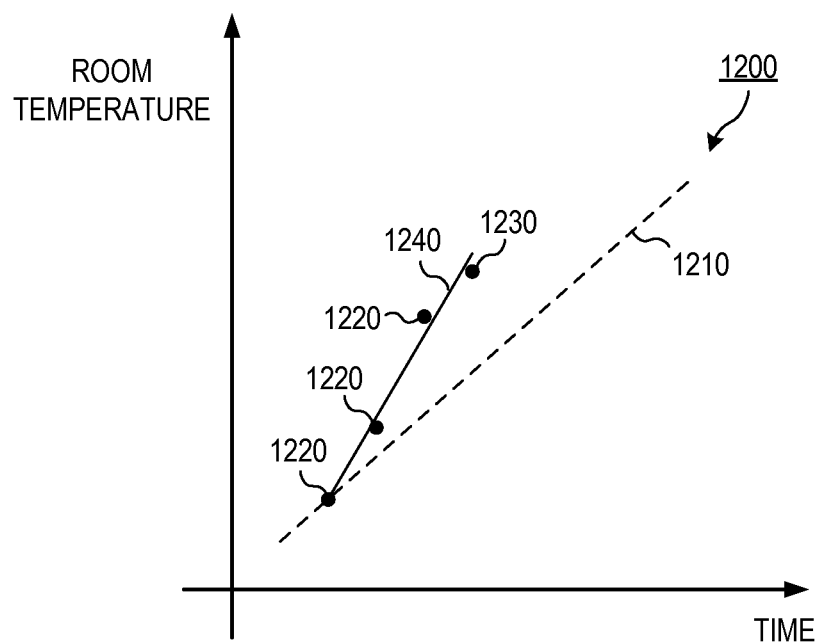
FIG. 12 is a graph showing aspects of a first or heating cooling operation in which a current capacity percentage of the HVAC unit should be reduced, according to disclosed embodiments.

FIG. 12 is a graph showing aspects of a first or second heating operation 250, 260 in which a current capacity percentage of the HVAC unit should be reduced, according to disclosed embodiments. As shown in FIG. 12, graph 1200 is of room temperature versus time and includes a line 1210 provided to indicate a desired rate of temperature change. The slope of this line 1210 represents a desired room temperature change rate (dT), as well as a desired room heating change rate (desired $dT_H$). This desired room heating change rate (desired $dT_H$) can be used as a first or second heating threshold ($T_{H1}$ or $T_{H2}$), depending upon whether graph 1200 represents a first heating operation 250 or a second heating operation 260.

Graph 1200 also includes a plurality of previous temperature measurements 1220 and a current temperature measurement 1230. A best-fit line 1240 can be determined based on these temperature measurements 1220, 1230. This line 1240 represents the actual rate of temperature change in the area to be heated. The slope of this line 140 represents an actual room temperature change rate (dT), as well as an actual room heating change rate ($dT_H$).

In the disclosed embodiment one current temperature measurement 1230 and three previous temperature measurements 1220 are provided. This is by way of example only. Alternate embodiments can use more or fewer previous temperature measurements 1220.

As can be seen in FIG. 12, the slope of the actual room heating change rate line 1240 is greater than the slope of the desired heating change rate line 910. This corresponds to a calculated room heating change rate ($dT_H$) being greater than a first or second heating threshold ($T_{H1}$ or $T_{H2}$). As shown in FIGS. 5 and 6, when this occurs, the current capacity percentage of the HVAC unit 130 will be lowered by a corresponding heating increment, down to a minimum of 0%.

In other words, when the actual room heating change rate is greater than the desired room heating change rate, the HVAC interface 120 will lower the current capacity percentage of the HVAC unit 130, causing it to reduce the amount of heating it provides to the area. This, in turn, will lessen the actual room heating change rate, bringing it closer to the desired room heating change rate.

Figure 13:
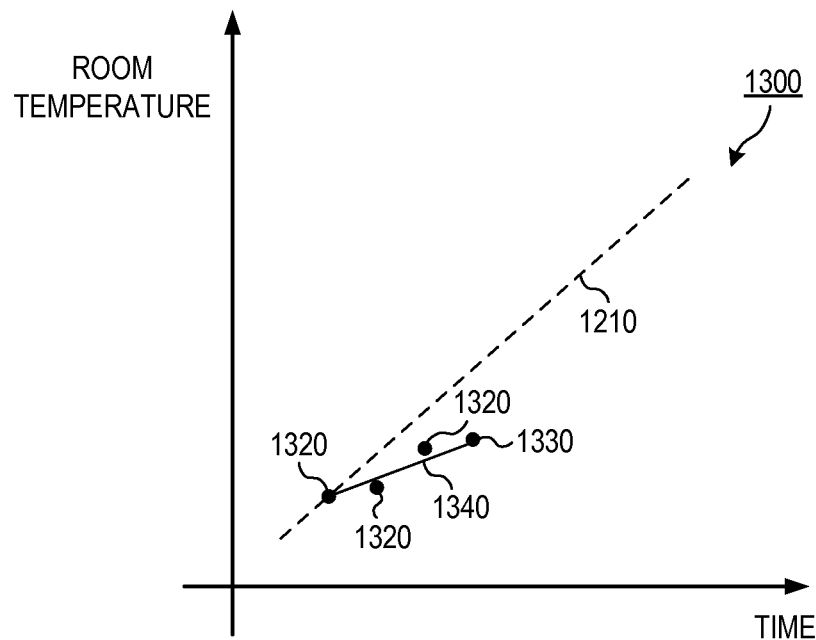
FIG. 13 is a graph showing aspects of a first or heating cooling operation in which a current capacity percentage of the HVAC unit should be increased, according to disclosed embodiments.

FIG. 13 is a graph showing aspects of a first or second heating operation 250, 260 in which a current capacity percentage of the HVAC unit should be increased, according to disclosed embodiments. As shown in FIG. 13, the graph 1300 is of room temperature versus time and includes the line 1210 that indicates a desired rate of temperature change. As noted above, the slope of this line 1210 indicates a desired room heating change rate (desired $dT_C$), which can be used as a first or second heating threshold ($T_{H1}$ or $T_{H2}$), depending upon whether graph 1300 represents a first heating operation 250 or a second heating operation 260.

Graph 1300 also includes a plurality of previous temperature measurements 1320 and a current temperature measurement 1330. A best-fit line 1340 can be determined based on these temperature measurements 1320, 1330. This line 1340 represents the actual rate of temperature change in the area to be heated. The slope of this line 1340 represents an actual room temperature change rate (dT), as well as an actual room heating change rate ($dT_H$).

In the disclosed embodiment one current temperature measurement 1330 and three previous temperature measurements 1020 are provided. This is by way of example only. Alternate embodiments can use more or fewer previous temperature measurements 1320.

As can be seen in FIG. 13, the slope of the actual room heating change rate line 1340 is less than the slope of the desired room heating change rate line 1310. This corresponds to a calculated room cooling change rate ($dT_H$) being less than a first or second heating threshold ($T_{H1}$ or $T_{H2}$). As shown in FIGS. 5 and 6, when this occurs, the current capacity percentage will be raised by a corresponding heating increment, up to a maximum of 100%.

In other words, when the actual room heating change rate is less than the desired room heating change rate, the HVAC interface 120 will raise the current capacity percentage of the HVAC unit 130, causing it to increase the amount of heating it provides to the area. This, in turn, will increase the actual room heating change rate, bringing it closer to the desired room heating change rate.

Figure 14:
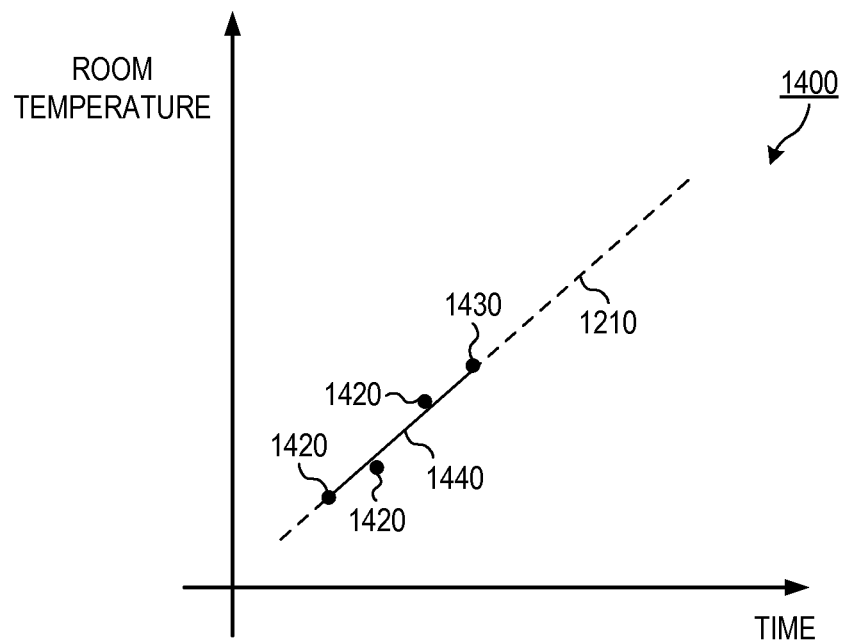
FIG. 14 is a graph showing aspects of a first or second heating operation in which a current capacity percentage of the HVAC unit should be maintained, according to disclosed embodiments.

FIG. 14 is a graph showing aspects of a first or second heating operation 250, 260 in which a current capacity percentage of the HVAC unit 130 should be maintained, according to disclosed embodiments. As shown in FIG. 14, graph 1400 is of room temperature versus time and includes the line 1210 that indicates a desired rate of temperature change. As noted above, the slope of this line 1210 indicates a desired room heating change rate (desired $dT_H$), which can be used as a first or second heating threshold ($T_{H1}$ or $T_{H2}$), depending upon whether graph 1400 represents a first heating operation 250 or a second heating operation 260.

Graph 1400 also includes a plurality of previous temperature measurements 1420 and a current temperature measurement 1430. A best-fit line 1440 can be determined based on these temperature measurements 1420, 1430. This line 1440 represents the actual rate of temperature change in the area to be heated. The slope of this line 1440 represents an actual room temperature change rate (dT), as well as an actual room heating change rate ($dT_H$).

In the disclosed embodiment one current temperature measurement 1430 and three previous temperature measurements 1420 are provided. This is by way of example only. Alternate embodiments can use more or fewer previous temperature measurements 1420.

As can be seen in FIG. 14, the magnitude of the slope of the actual room heating change rate line 1440 is equal to the slope of the desired room heating change rate line 1210. This corresponds to a calculated room heating change rate ($dT_H$) being equal to a first or second heating threshold ($T_{H1}$ or $T_{H2}$). As shown in FIGS. 5 and 6, when this occurs, the current capacity percentage will be maintained.

In other words, when the actual room heating change rate is equal to the desired room heating change rate, the HVAC interface 120 will maintain the current capacity percentage of the HVAC unit 130. Since the HVAC unit 130 is heating the area at the desired rate, there is no need to change the current capacity percentage of the HVAC unit 130.

Alternate Embodiments

Figure 15:
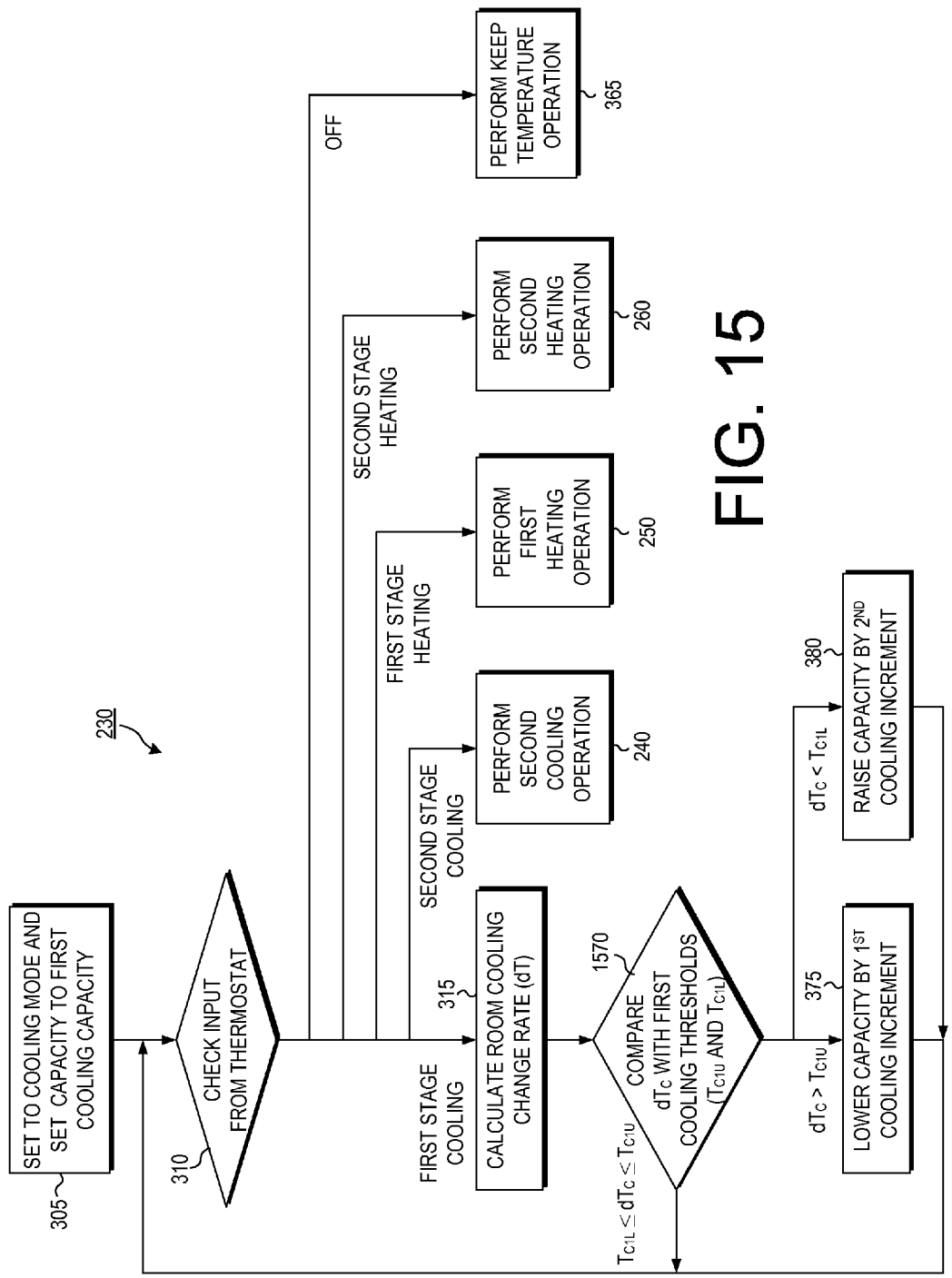
FIG. 15 is a flow chart of the first cooling of FIG. 1 according to alternate disclosed embodiments.

FIG. 15 is a flow chart of the first cooling operation 230 of FIG. 2 according to alternate disclosed embodiments. In particular, FIG. 15 shows a first cooling operation 230 that employs multiple cooling thresholds $T_{C1U}$ and $T_{C1L}$.

This embodiment of the first cooling operation 230 is similar to the first cooling operation 230 of FIG. 3. Similar elements operate as disclosed above. In order to simplify of the disclosure, these elements will not be described again.

As shown in FIG. 15, once the room cooling change rate ($dT_C$) has been calculated, the HVAC interface 120 compares the room cooling change rate ($dT_C$) with a first upper cooling threshold ($T_{C1U}$) and a first lower cooling threshold ($T_{C1L}$), e.g., using the comparator 150 (1570). The first upper cooling threshold ($T_{C1U}$) and the first lower cooling threshold ($T_{C1L}$) define a desired range for the room cooling change rate for the first cooling operation 230. They can be visualized as two lines whose slopes frame a desired range for the rate of cooling (multiplied by −1 to provide a positive value for increased cooling). By comparing the room cooling change rate ($dT_C$) with the first upper cooling threshold ($T_{C1U}$) and a first lower cooling threshold ($T_{C1L}$), the HVAC interface 120 can determine whether the HVAC unit is cooling an area slower than desired, quicker than desired, or exactly as desired.

If the room cooling change rate ($dT_C$) is between the first upper cooling threshold ($T_{C1U}$) and the first lower cooling threshold ($T_{C1L}$), inclusive, (i.e., $T_{C1L} \leq dT_C \leq T_{C1U}$), then the room cooling change rate ($dT_C$) is exactly within a desired range. This means that the HVAC unit 130 is operating precisely at an acceptable capacity. In this case, the HVAC interface 120 does nothing, but returns to again check which staging signal is enabled by the thermostat 110 (310). The HVAC interface 120 may delay this check by a delay time (e.g., 0-90 seconds) in some embodiments.

If the room cooling change rate ($dT_C$) is greater than the first upper cooling threshold ($T_{C1U}$) (i.e., $dT_C > T_{C1U}$), then the room cooling change rate ($dT_C$) is higher than a desired value. This means that the HVAC unit 130 is operating at a higher capacity than is desired, and is cooling an area too quickly. In this case, the HVAC interface 120 lowers the current capacity percentage by a first cooling increment (375), down to a minimum of 0%, and then returns to again check which staging signal is enabled by the thermostat 110 (after the delay time, in some embodiments) (310).

By reducing the current capacity percentage by the first cooling increment (375), the HVAC interface 120 causes the HVAC unit 130 to cool the area less quickly, and moves the room cooling change rate ($dT_C$) closer to its desired value.

If the room cooling change rate ($dT_C$) is less than the first lower cooling threshold ($T_{C1}$) (i.e., $dT_C < T_{C1L}$), then the room cooling change rate ($dT_C$) is lower than a desired value. This means that the HVAC unit 130 is operating at a lower capacity than is desired, and is cooling an area too slowly. In this case, the HVAC interface 120 raises the current capacity percentage by a second cooling increment (380), up to a maximum of 100%, and then returns to again check which staging signal is enabled by the thermostat 110 (after the delay time, in some embodiments) (310).

By increasing the current capacity percentage by the second cooling increment (380), the HVAC interface 120 causes the HVAC unit 130 to cool the area more quickly, and moves the room cooling change rate ($dT_C$) closer to its desired value.

By performing these adjustments to the current capacity percentage during the first cooling operation, the HVAC interface 120 can better and more efficiently maintain a desired temperature in an area, despite the fact that it receives only a single ON/OFF first-stage cooling signal, without any granularity.

It will be understood by those of ordinary skill in the art that the use of multiple thresholds can be extended to the second cooling 240 operation as well as the first and second heating operations 250, 260.

Figure 16:
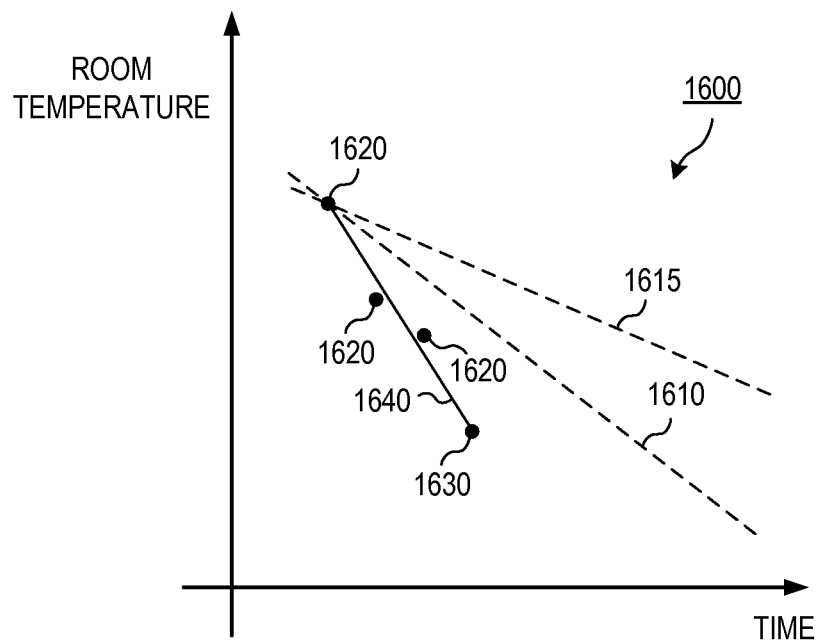
FIG. 16 is a graph showing aspects of a first or second cooling operation in which a current capacity percentage of the HVAC unit should be reduced, according to alternate disclosed embodiments.

FIG. 16 is a graph showing aspects of a first or second cooling operation 230, 240 in which a current capacity percentage of the HVAC unit should be reduced, according to alternate disclosed embodiments. As shown in FIG. 16, graph 1600 is of room temperature versus time and includes lines 1610 and 1615 that are provided to indicate a desired range of temperature change. The slopes of the lines 1610 and 1615 frame a desired range for the room temperature change rate (dT). The desired room temperature change rate multiplied by −1 indicates a desired room cooling change rate (desired $dT_C$). This desired room cooling change rate (desired $dT_C$) for these two lines 1610 and 1615 can be used as a first upper and first lower cooling thresholds or second upper and second lower cooling thresholds ($T_{C1U}$ and $T_{C1L}$ or $T_{C2U}$ and $T_{C2L}$), depending upon whether graph 1600 represents a first cooling operation 230 or a second cooling operation 240.

Graph 1600 also includes a plurality of previous temperature measurements 1620 and a current temperature measurement 1630. A best-fit line 1640 can be determined based on these temperature measurements 1620, 1630. This line 1640 represents the actual rate of temperature change in the area. The slope of this line 1640 represents an actual room temperature change rate (dT). The actual room temperature change rate multiplied by −1 indicates an actual room cooling change rate ($dT_C$). In this determination, lines 1610, 1615, and 1640 all intersect at the oldest stored temperature measurement 1620.

In the disclosed embodiment one current temperature measurement 1630 and three previous temperature measurements 1620 are provided. This is by way of example only. Alternate embodiments can use more or fewer previous temperature measurements 1620.

As can be seen in FIG. 16, the magnitude of the slope of the actual room temperature change rate line 1640 is greater than the magnitude of the slope of either of the desired temperature change rate lines 1610 and 1615. As a result, it lies outside the area defined by these two lines 1610 and 1615. This corresponds to a calculated room cooling change rate ($dT_C$) being greater than a first or second upper threshold ($T_{C1U}$ or $T_{C2U}$). As shown in FIG. 15, when this occurs, the current capacity percentage will be lowered by a corresponding cooling increment, down to a minimum of 0%.

In other words, when the actual room cooling change rate is greater than the desired cooling change rate range, the HVAC interface 120 will lower the current capacity percentage of the HVAC unit 130, causing it to reduce the amount of cooling it provides. This, in turn, will lessen the actual room cooling change rate, bringing it closer to the desired room cooling change rate range.

Figure 17:
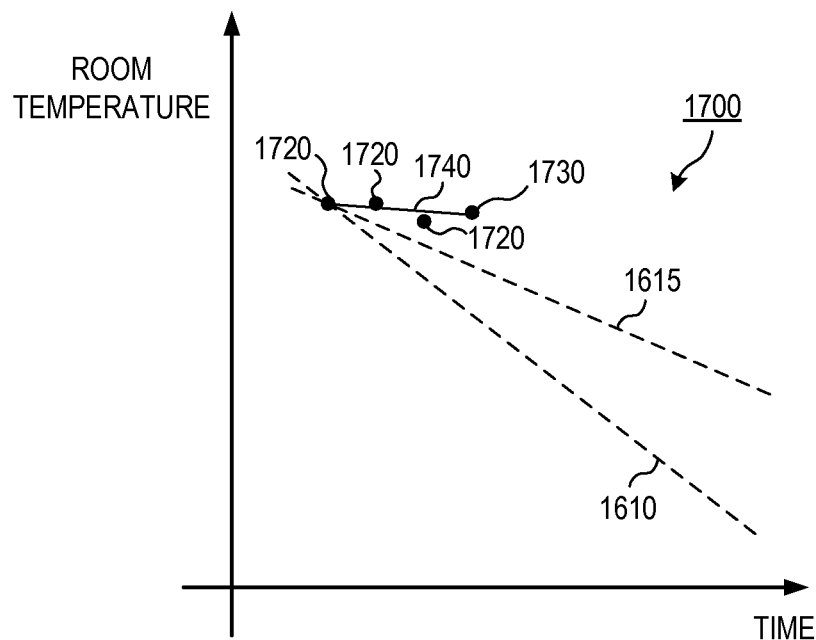
FIG. 17 is a graph showing aspects of a first or second cooling operation in which a current capacity percentage of the HVAC unit should be increased, according to alternate disclosed embodiments.

FIG. 17 is a graph showing aspects of a first or second cooling operation 230, 240 in which a current capacity percentage of the HVAC unit 130 should be increased, according to alternate disclosed embodiments. As shown in FIG. 17, graph 1700 is of room temperature versus time and includes the lines 1610 and 1615 that define a desired range for a rate of temperature change for the area to be cooled. As noted above, the slopes of these lines 1610 and 1615 are multiplied by −1 to indicate a desired room cooling change rate (desired $dT_C$), which can be used as first upper and first lower cooling thresholds or second upper and second lower cooling thresholds ($T_{CU1}$ and $T_{C1L}$ or $T_{C2U}$ and $T_{C2L}$), depending upon whether graph 1700 represents a first cooling operation 230 or a second cooling operation 240.

Graph 1700 also includes a plurality of previous temperature measurements 1720 and a current temperature measurement 1730. A best-fit line 1740 can be determined based on these temperature measurements 1720, 1730. This line 1740 represents the actual rate of temperature change in the area. The slope of this line 1740 represents an actual room temperature change rate (dT). The actual room temperature change rate multiplied by −1 indicates an actual room cooling change rate ($dT_C$).

In the disclosed embodiment one current temperature measurement 1730 and three previous temperature measurements 1720 are provided. This is by way of example only. Alternate embodiments can use more or fewer previous temperature measurements 1720.

As can be seen in FIG. 17, the magnitude of the slope of the actual room temperature change rate line 1740 is below the desired range as defined by the magnitude of the slopes of the desired temperature change rate lines 1610 and 1615. This corresponds to a calculated room cooling change rate ($dT_C$) being below the first lower cooling threshold or the second lower cooling threshold ($T_{C1L}$ or $T_{C2L}$). As shown in FIG. 15, when this occurs, the current capacity percentage will be increased.

In other words, when the actual room cooling change rate is below the desired cooling change rate range, the HVAC interface 120 will increase the current capacity percentage of the HVAC unit 130, causing it to increase the amount of cooling it provides. This, in turn, will increase the actual room cooling change rate, bringing it closer to the desired room cooling change rate range.

Figure 18:
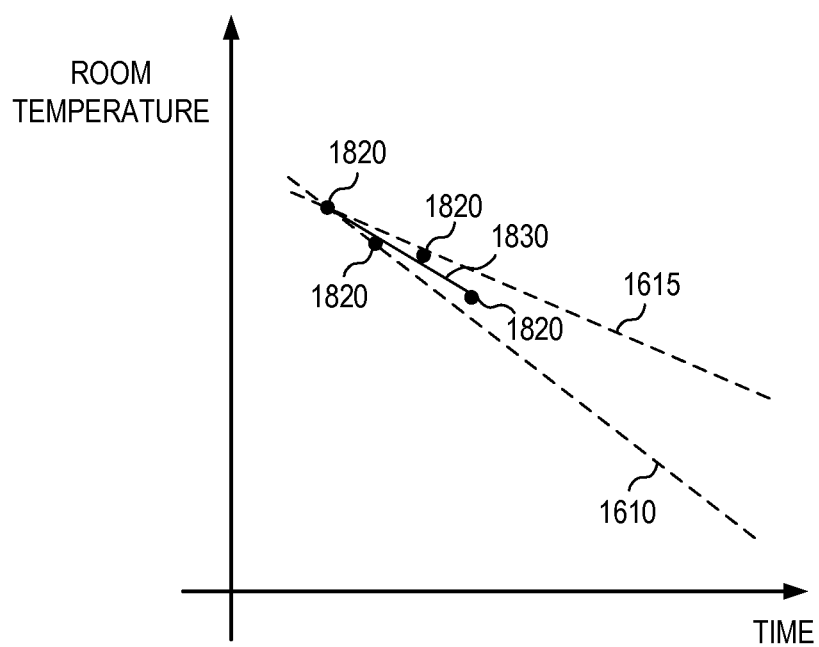
FIG. 18 is a graph showing aspects of a first or second cooling operation in which a current capacity percentage of the HVAC unit should be maintained, according to alternate disclosed embodiments.

FIG. 18 is a graph showing aspects of a first or second cooling operation 230, 240 in which a current capacity percentage of the HVAC unit 130 should be maintained, according to alternate disclosed embodiments. As shown in FIG. 18, graph 1800 is of room temperature versus time and includes the lines 1610 and 1615 that define a desired range for a rate of temperature change for the area to be cooled. As noted above, the slopes of these lines 1610 and 1615 are multiplied by −1 to indicate a desired room cooling change rate (desired $dT_C$), which can be used as first upper and first lower cooling thresholds or second upper and second lower cooling thresholds ($T_{CU1}$ and $T_{C1L}$ or $T_{C2U}$ and $T_{C2L}$), depending upon whether graph 1800 represents a first cooling operation 230 or a second cooling operation 240.

Graph 1800 also includes a plurality of previous temperature measurements 1820 and a current temperature measurement 1830. A best-fit line 1740 can be determined based on these temperature measurements 1820, 1830. This line 1840 represents the actual rate of temperature change in the area. The slope of this line 1840 represents an actual room temperature change rate (dT). The actual room temperature change rate multiplied by −1 indicates an actual room cooling change rate ($dT_C$).

In the disclosed embodiment one current temperature measurement 1830 and three previous temperature measurements 1820 are provided. This is by way of example only. Alternate embodiments can use more or fewer previous temperature measurements 1820.

As can be seen in FIG. 18, the magnitude of the slope of the actual room temperature change rate line 1840 is within the desired range as defined by the magnitude of the slopes of the desired temperature change rate lines 1610 and 1615. This corresponds to a calculated room cooling change rate ($dT_C$) being between a first upper and first lower cooling threshold or a second upper and second lower cooling threshold ($T_{C1U}$ and $T_{C1L}$ or $T_{C2U}$ and $T_{C2L}$). As shown in FIG. 15, when this occurs, the current capacity percentage will be maintained.

In other words, when the actual room cooling change rate is within the desired cooling change rate range, the HVAC interface 120 will maintain the current capacity percentage of the HVAC unit 130. Since the HVAC unit 130 is cooling the area within the desired rate range, there is no need to change the current capacity percentage of the HVAC unit 130.

It will be understood by those of ordinary skill in the art that these graphs could be expanded in a manner similar to those shown in FIGS. 10 and 12-14 to illustrate the use of multiple thresholds in a heating operation.

Conclusion

Although in the examples above two-stage cooling and two-stage heating is disclosed, this is by way of example only. Alternate embodiments could employ single stage cooling, single stage heating or more than two stages of heating and/or cooling.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed is:

1. A method for controlling a heating, ventilating, and air conditioning (HVAC) unit, comprising:
   receiving a first thermostat input from a thermostat;
   setting a current mode of the HVAC unit to a heating mode when a heating signal is enabled in the first thermostat input, or to a cooling mode when a cooling signal is enabled in the first thermostat input;
   setting a current capacity percentage of the HVAC unit to a first capacity percentage based on the first thermostat input;
   calculating a first room heating/cooling change rate based on first temperature data received from the HVAC unit;
   comparing the first room heating/cooling change rate with a first threshold;
   maintaining the HVAC unit at the first capacity percentage if the first room heating/cooling change rate is equal to the first threshold;
   lowering the current capacity percentage by a first cooling increment, to a minimum of 0%, if the first room heating/cooling change rate is above the first threshold;
   raising the current capacity percentage by a second cooling increment, to a maximum of 100%, if the first room heating/cooling change rate is below the first threshold;
   receiving an off indicator from the thermostat after either maintaining the current capacity, lowering the current capacity, or raising the current capacity;
   setting a current room temperature as a set point temperature for the HVAC to maintain in the current mode;
   waiting for a first timeout period for further signals from the thermostat;
   receiving only the off indicator from the thermostat during the first timeout period;
   setting the HVAC unit to a minimum capacity percentage in the current mode;
   waiting for a second timeout period for further signals from the thermostat;
   receiving only the off indicator from the thermostat during the second timeout period; and
   turning off the HVAC unit.

2. The method of claim 1, wherein
   the operations of receiving a first thermostat input, the setting of the current mode of the HVAC unit, the setting of the HVAC unit to the first capacity percentage, the calculating of the first room heating/cooling change rate, the comparing of the first room heating/cooling change rate with the first threshold, the maintaining of the current capacity percentage, the lowering of the current capacity, and the raising of the current capacity percentage are repeated a plurality of times.

3. The method of claim 1, wherein
   the first room heating/cooling change rate is equal to a current room temperature change rate if the current mode is the heating mode, and
   the first room heating/cooling change rate is equal to the current room temperature change rate multiplied by −1 if the current mode is the cooling mode.

4. The method of claim 1, wherein the first capacity percentage is between 1-50%, inclusive.

5. The method of claim 1, wherein
   the first cooling increment is between 5-20%, inclusive, and
   the second cooling increment is between 5-20%, inclusive.

6. The method of claim 1, wherein
   the first cooling increment is a first function of the first cooling threshold and the first room heating/cooling change rate, and
   the second cooling increment is a second function of the first cooling threshold and the first room heating/cooling change rate.

7. The method of claim 1, further comprising:
   receiving a second thermostat input from the thermostat;
   setting a current mode of the HVAC unit to a heating mode when a heating signal is enabled in the second thermostat input, or to a cooling mode when a cooling signal is enabled in the second thermostat input;
   setting the current capacity percentage of the HVAC unit to a second capacity percentage different than the first capacity percentage based on the second thermostat input;
   calculating a second room heating/cooling change rate based on second temperature data received from the HVAC unit;
   comparing the second room heating/cooling change rate with a second threshold;
   maintaining the current capacity percentage if the second temperature change rate is equal to the second threshold;
   lowering the current capacity percentage by a third cooling increment, to a minimum of 0%, if the second room heating/cooling change rate is above the second threshold; and
   raising the current capacity percentage by a fourth cooling increment, to a maximum of 100%, if the second room heating/cooling change rate is below the second threshold.

8. The method of claim 7, wherein
   the operations of receiving a second thermostat input, the setting of the current mode of the HVAC unit, the setting of the HVAC unit to the second capacity percentage, the calculating of the second room heating/cooling change rate, the comparing of the second room heating/cooling change rate with the second threshold, the maintaining of the current capacity percentage, the lowering of the current capacity percentage, and the raising of the current capacity percentage are repeated a plurality of times.

9. The method of claim 7, wherein
the second room heating/cooling change rate is equal to the current room temperature change rate if the current mode is the heating mode, and
the second room heating/cooling change rate is equal to the current room temperature change rate multiplied by −1 if the current mode is the cooling mode.

10. The method of claim 7, wherein the second capacity percentage is between 50-100%, inclusive.

11. The method of claim 7, wherein
the third cooling increment is between 5-20%, inclusive, and
the fourth cooling increment is between 5-20%, inclusive.

12. The method of claim 7, wherein
the third cooling increment is a first function of the second cooling threshold and the second temperature change rate, and
the fourth cooling increment is a second function of the second cooling threshold and the second temperature change rate.

13. The method of claim 1, further comprising:
receiving an off indicator from the thermostat after either maintaining the current capacity, lowering the current capacity, or raising the current capacity;
setting a current room temperature as a set-point temperature for the HVAC to maintain;
receiving a third thermostat input from the thermostat during a first timeout period;
setting the current mode of the HVAC unit to a heating mode when a heating signal is enabled in the third thermostat input, or to a cooling mode when a cooling signal is enabled in the third thermostat input;
setting the current capacity percentage of the HVAC unit to a third capacity percentage based on the third thermostat input value;
calculating a third room heating/cooling change rate based on third temperature data received from the HVAC unit;
comparing the third room heating/cooling change rate with a third threshold;
maintaining the current capacity percentage if the third room heating/cooling change rate is equal to the third threshold;
lowering the current capacity percentage by a fifth cooling increment, to a minimum of 0%, if the third room heating/cooling change rate is above the third threshold; and
raising the current capacity percentage by a sixth cooling increment, to a maximum of 100%, if the third room heating/cooling change rate is above the third threshold.

14. The method of claim 1, further comprising:
comparing the first room heating/cooling change rate with a first threshold and a fourth threshold;
maintaining the current capacity percentage if the first room heating/cooling change rate is between the first threshold and the fourth threshold, inclusive;
lowering the current capacity by the first cooling increment, to a minimum of 0%, if the first room heating/cooling change rate is above the first threshold; and
raising the current capacity by a second cooling increment, to a maximum of 100%, if the first room heating/cooling change rate is below the fourth threshold.

15. A method for controlling a heating, ventilating, and air conditioning (HVAC) unit, comprising:
receiving a first thermostat input from a thermostat;
setting a current mode of the HVAC unit to a heating mode when a heating signal is enabled in the first thermostat input, or to a cooling mode when a cooling signal is enabled in the first thermostat input;
setting a current capacity percentage of the HVAC unit to a first capacity based on the first thermostat input;
receiving an off indicator from the thermostat after setting the current mode of the HVAC unit;
setting a current room temperature as a set point temperature for the HVAC to maintain in the current mode;
waiting for a first timeout period for further signals from the thermostat;
receiving only the off indicator from the thermostat during the first timeout period;
setting the current capacity percentage of the HVAC unit to a minimum capacity in the current mode after receiving only the off value from the thermostat during the first timeout period;
waiting for a second timeout period for further signals from the thermostat;
receiving only the off indicator from the thermostat during the second timeout period; and
turning off the HVAC unit after receiving only the off indicator from the thermostat during the second timeout period.

16. The method of claim 15, wherein
the first timeout period is between 0-30 minutes,
the second timeout period is between 0-30 minutes, and
at least one of the first and second timeout periods is above zero.

17. A non-transitory computer-readable medium comprising instructions for execution by a computer, the instructions including a computer-implemented method for providing a method for controlling a heating, ventilating, and air conditioning (HVAC) unit, the instructions for implementing:
receiving a first thermostat input from a thermostat;
setting a current mode of the HVAC unit to a heating mode when a heating signal is enabled in the first thermostat input, or to a cooling mode when a cooling signal is enabled in the first thermostat input;
setting a current capacity percentage of the HVAC unit to a first capacity percentage based on the first thermostat input;
calculating a first room heating/cooling change rate based on first temperature data received from the HVAC unit;
comparing the first room heating/cooling change rate with a first threshold;
maintaining the HVAC unit at the first capacity percentage if the first room heating/cooling change rate is equal to the first threshold;
lowering the current capacity percentage by a first cooling increment, to a minimum of 0%, if the first room heating/cooling change rate is above the first threshold;
raising the current capacity percentage by a second cooling increment, to a maximum of 100%, if the first room heating/cooling change rate is below the first threshold;
receiving an off indicator from the thermostat after either maintaining the current capacity, lowering the current capacity, or raising the current capacity;
setting a current room temperature as a set point temperature for the HVAC to maintain in the current mode;
waiting for a first timeout period for further signals from the thermostat;
receiving only the off indicator from the thermostat during the first timeout period;

setting the HVAC unit to a minimum capacity percentage in the current mode;
waiting for a second timeout period for further signals from the thermostat;
receiving only the off indicator from the thermostat during the second timeout period; and
turning off the HVAC unit.

18. The non-transitory computer-readable medium of claim 17, wherein the instructions are for further implementing:
receiving a second thermostat input from the thermostat;
setting a current mode of the HVAC unit to a heating mode when a heating signal is enabled in the second thermostat input, or to a cooling mode when a cooling signal is enabled in the second thermostat input;
setting the current capacity percentage of the HVAC unit to a second capacity percentage different than the first capacity percentage based on the second thermostat input;
calculating a second room heating/cooling change rate based on second temperature data received from the HVAC unit;
comparing the second room heating/cooling change rate with a second threshold;
maintaining the current capacity percentage if the second temperature change rate is equal to the second threshold;
lowering the current capacity percentage by a third cooling increment, to a minimum of 0%, if the second room heating/cooling change rate is above the second threshold; and
raising the current capacity percentage by a fourth cooling increment, to a maximum of 100%, if the second room heating/cooling change rate is below the second threshold.

19. The non-transitory computer-readable medium of claim 17, wherein the instructions are for further implementing:
receiving an off indicator from the thermostat after either maintaining the current capacity, lowering the current capacity, or raising the current capacity;
setting a current room temperature as a set point temperature for the HVAC to maintain;
receiving a third thermostat input from the thermostat during a first timeout period;
setting the current mode of the HVAC unit to a heating mode when a heating signal is enabled in the third thermostat input, or to a cooling mode when a cooling signal is enabled in the third thermostat input;
setting the current capacity percentage of the HVAC unit to a third capacity percentage based on the third thermostat input;
calculating a third room heating/cooling change rate based on third temperature data received from the HVAC unit;
comparing the third room heating/cooling change rate with a third threshold;
maintaining the current capacity percentage if the third room heating/cooling change rate is equal to the third threshold;
lowering the current capacity percentage by a fifth cooling increment, to a minimum of 0%, if the third room heating/cooling change rate is above the third threshold; and
raising the current capacity percentage by a sixth cooling increment, to a maximum of 100%, if the third room heating/cooling change rate is above the third threshold.

20. The non-transitory computer-readable medium of claim 17, wherein
the first room heating/cooling change rate is equal to the current room temperature change rate if the current mode is the heating mode, and
the first room heating/cooling change rate is equal to the current room temperature change rate multiplied by −1 if the current mode is the cooling mode.

21. The non-transitory computer-readable medium of claim 17, wherein
the first cooling increment is a first function of the first cooling threshold and the first room heating/cooling change rate, and
the second cooling increment is a second function of the first cooling threshold and the first room heating/cooling change rate.

22. The non-transitory computer-readable medium of claim 17, wherein
the second room heating/cooling change rate is equal to the current room temperature change rate if the current mode is the heating mode, and
the second room heating/cooling change rate is equal to the current room temperature change rate multiplied by −1 if the current mode is the cooling mode.

23. The non-transitory computer-readable medium of claim 17, wherein
the third cooling increment is a first function of the second cooling threshold and the second room heating/cooling change rate, and
the fourth cooling increment is a second function of the second cooling threshold and the second room heating/cooling change rate.

24. The non-transitory computer-readable medium of claim 17, wherein the instructions are for further implementing:
comparing the first room heating/cooling change rate with a first threshold and a fourth threshold;
maintaining the current capacity percentage if the first room heating/cooling change rate is between the first threshold and the fourth threshold, inclusive;
lowering the current capacity by the first cooling increment, to a minimum of 0%, if the first room heating/cooling change rate is above the first threshold; and
raising the current capacity by a second cooling increment, to a maximum of 100%, if the first room heating/cooling change rate is below the fourth threshold.

25. A method for controlling a heating, ventilating, and air conditioning (HVAC) unit, which operates in a heating mode or a cooling mode with a current capacity based on temperature data from the HVAC unit, comprising:
receiving a four-stage signal from a thermostat;
determining whether the four-stage signal is a first stage cooling signal, a second stage cooling signal, a first stage heating signal, a second stage heating signal, or is off;
when the four-stage signal is a first stage cooling signal
calculating a first room heating/cooling change rate based on first temperature data;
comparing the first room heating/cooling change rate with a first threshold;
controlling a capacity percentage of the HVAC unit by lowering the current capacity by a first cooling increment, to a minimum of 0%, if the first room heating/cooling change rate is above the first threshold or by raising the current capacity by a second cooling increment, to a maximum of 100%, if the first room heating/cooling change rate is below the first threshold, and when the four-stage signal is a second stage cooling signal
calculating the first room heating/cooling change rate based on first temperature data;
comparing the first room heating/cooling change rate with a second threshold;
controlling a capacity percentage of the HVAC unit by lowering the current capacity by a third cooling increment, to a minimum of 0%, if the first room heating/cooling change rate is above the second threshold or by raising the current capacity by a fourth cooling increment, to a maximum of 100%, if the first room heating/cooling change rate is below the second threshold, wherein
the second threshold is different from the first threshold,
the third cooling increment is different from the first cooling increment, and
the fourth cooling increment is different from the second cooling increment.

26. A non-transitory computer-readable medium comprising instructions for execution by a computer, the instructions including a computer-implemented method for providing a method for controlling a heating, ventilating, and air conditioning (HVAC) unit, the instructions for implementing:

receiving a four-stage signal from a thermostat;
determining whether the four-stage signal is a first stage cooling signal, a second stage cooling signal, a first stage heating signal, a second stage heating signal, or is off;

when the four-stage signal is a first stage cooling signal
calculating a first room heating/cooling change rate based on first temperature data;
comparing the first room heating/cooling change rate with a first threshold;
controlling a capacity percentage of the HVAC unit by lowering the current capacity by a first cooling increment, to a minimum of 0%, if the first room heating/cooling change rate is above the first threshold or by raising the current capacity by a second cooling increment, to a maximum of 100%, if the first room heating/cooling change rate is below the first threshold; and when the four-stage signal is a second stage cooling signal
calculating the first room heating/cooling change rate based on first temperature data;
comparing the first room heating/cooling change rate with a second threshold;
controlling a capacity percentage of the HVAC unit by lowering the current capacity by a third cooling increment, to a minimum of 0%, if the first room heating/cooling change rate is above the second threshold or by raising the current capacity by a fourth cooling increment, to a maximum of 100%, if the first room heating/cooling change rate is below the second threshold, wherein
the second threshold is different from the first threshold,
the third cooling increment is different from the first cooling increment, and
the fourth cooling increment is different from the second cooling increment.

* * * * *